(12) United States Patent
Bergami et al.

(10) Patent No.: US 7,998,377 B2
(45) Date of Patent: Aug. 16, 2011

(54) APPARATUSES AND METHODS FOR PRODUCING OBJECTS

(75) Inventors: Stefano Bergami, Castel S. Pietro Terme (IT); Lorenzo Casadio, Lugo (IT)

(73) Assignee: Sacmi Cooperativa Meccanici Imola Societa' Cooperativa, Imola (BO) (IT)

( * ) Notice: Subject to any disclaimer, the term of this patent is extended or adjusted under 35 U.S.C. 154(b) by 646 days.

(21) Appl. No.: 11/630,401

(22) PCT Filed: Jun. 24, 2005

(86) PCT No.: PCT/IB2005/001802
§ 371 (c)(1),
(2), (4) Date: Dec. 22, 2006

(87) PCT Pub. No.: WO2006/006008
PCT Pub. Date: Jan. 19, 2006

(65) Prior Publication Data
US 2008/0057147 A1    Mar. 6, 2008

(30) Foreign Application Priority Data

Jun. 29, 2004   (IT) .............................. MO2004A0164

(51) Int. Cl.
*B29C 31/08* (2006.01)
*B29C 43/08* (2006.01)
(52) U.S. Cl. ....... 264/40.1; 425/143; 425/149; 425/170; 425/348 R
(58) Field of Classification Search .................. 425/149, 425/150, 143, 170, 171, 345, 348 R, 349, 425/809; 264/40.1
See application file for complete search history.

(56) References Cited

U.S. PATENT DOCUMENTS

| 3,827,843 | A | * | 8/1974 | Blouch .......................... 425/127 |
| 4,076,780 | A | | 2/1978 | Ditto et al. |
| 5,149,193 | A | * | 9/1992 | Faillace ..................... 425/379.1 |
| 5,336,074 | A | | 8/1994 | Kashiwa et al. |
| 5,395,565 | A | | 3/1995 | Nagaoka et al. |
| 5,578,159 | A | | 11/1996 | Miyashita et al. |
| 5,596,251 | A | | 1/1997 | Miller et al. |
| 5,807,592 | A | | 9/1998 | Alieri et al. |
| 5,811,044 | A | | 9/1998 | Rote et al. |
| 6,007,315 | A | * | 12/1999 | Busacchi ....................... 425/110 |
| 6,048,476 | A | * | 4/2000 | Lausenhammer et al. ..... 425/150 |
| 6,186,760 | B1 | * | 2/2001 | Latham ......................... 425/149 |
| 6,368,094 | B1 | * | 4/2002 | Dennis et al. .................. 425/809 |
| 7,018,191 | B2 | * | 3/2006 | Harris ........................... 425/144 |
| 2001/0011782 | A1 | | 8/2001 | Ide et al. |
| 2003/0102587 | A1 | | 6/2003 | Kobayashi et al. |
| 2003/0198703 | A1 | | 10/2003 | Johns et al. |
| 2003/0230821 | A1 | | 12/2003 | Okado et al. |
| 2005/0200038 | A1 | * | 9/2005 | Vogeleer et al. .............. 425/149 |

FOREIGN PATENT DOCUMENTS

| EP | 1 101 586 A2 | 5/2001 |
| EP | 1 101 587 A2 | 5/2001 |

* cited by examiner

*Primary Examiner* — Robert B Davis
*Assistant Examiner* — Thu Khanh T Nguyen
(74) *Attorney, Agent, or Firm* — Nixon & Vanderhye P.C.

(57) ABSTRACT

An apparatus comprises a transfer device rotatable at a speed to transfer a dose of plastics from a supply device to a forming device of said dose, a control device that is suitable for varying said speed in a substantially continuous manner between a minimum value and a maximum value being associated with said transfer device.

22 Claims, 17 Drawing Sheets

APPARATUSES AND METHODS FOR PRODUCING OBJECTS

This application is the US national phase of international application PCT/IB2005/001802 filed 24 Jun. 2005, which designated the U.S. and claimed priority of IT MO2004A000164 filed 29 Jun. 2004, the entire contents of each of which are hereby incorporated by reference.

The invention relates to apparatuses and methods for producing objects, in particular by compression-moulding of plastics. The apparatuses and methods according to the invention can for example be used to obtain threaded caps and capsules suitable for closing containers and more in particular bottles.

In order to produce caps by means of compression moulding industrially, apparatuses comprising an extruder from which plastics in viscous liquid state exit are usually used. A first carousel, peripherally provided with a plurality of knives, rotates around a first vertical axis and interacts with the extruder to remove a dose of plastics from it, which dose of plastics, owing to its viscosity, remains adhering to the respective knife. The apparatus furthermore comprises a second carousel, rotatable around a second vertical axis and peripherally provided with a plurality of moulds. The second carousel is arranged in a tangential position in relation to the first carousel, in such a way that, during rotation, each knife deposits in a corresponding mould the dose that it previously removed from the extruder. In order to maximise the number of caps produced over the unit of time, apparatuses have been developed in which the second carousel is provided with 12 or even 64 moulds.

Each mould comprises a punch, which reproduces the internal surface of the cap, and a die, which reproduces the external surface thereof. The die is movable in relation to the punch between an opening position in which the die is spaced apart from the punch in such a way that between them the dose to be formed can be inserted, and a closing position in which the die cooperates with the punch to define a forming chamber inside which the cap is moulded.

Test machines are known having a simplified structure in relation to the apparatuses disclosed above, that are used to simulate the behaviour of a production apparatus if it is for example desired to study a new type of cap or to analyse the behaviour of plastics of a new type.

The test machines comprise an extruder, provided with a screw that conveys plastics to an extrusion port from which the extruded plastics exit continuously.

The test machine is furthermore equipped with an arm pneumatically rotated around a vertical axis, the arm being provided with a knife suitable for removing a dose of plastics from the extrusion port, to deposit it subsequently in a mould inside which the cap is formed. The mould comprises a punch and die, driven in motion of translation by a hydraulic actuator between an opening position, in which the die can receive the dose from the arm, and a closing position, in which the die cooperates with the punch to shape the dose. The actuator is controlled by an on/off, valve, i.e. it can assume only two positions: when the valve is open the actuator is in communication with a chamber in which the operating fluid is stored, whereas when the valve is shut the actuator is isolated from the chamber.

A drawback of the known test machines is that the arm is actuated at a constant rotation speed. This does not enable the behaviour of the production apparatuses to be simulated with great precision, in which the speed of the first carousel depends on the production speed of the apparatus and on the type of apparatus.

Furthermore, in the test machines the rotation speed of the arm is rather low in relation to the speeds that are reached during industrial production of the caps. This involves long cycle times, which enable what occurs industrially to be reproduced only very approximately.

Another drawback of the known test machines is that the die is moved by the actuator at a constant speed, as the operating fluid flow rate that can enter or exit the actuator when the on/off is open is preset. This does not enable the behaviour of production apparatuses to be reproduced with precision, in which the movement speed of the die depends on the type of apparatus and on the number of caps produced over the unit of time.

Furthermore, in known test machines the extrusion speed of the plastics is very low, inasmuch as during the time required for the arm to perform a complete rotation, only the quantity of plastics corresponding to the weight of a dose exits from the extrusion port. This is very different from what happens in apparatuses for producing caps industrially, in which during a complete rotation of the first carousel the extruder produces a number of doses corresponding to the number of knives provided on the carousel.

In apparatuses for producing caps, whether they be intended to be used industrially or as test machines, when the die moves away from the punch, the cap that has just been formed remains associated with the latter.

In order to remove the cap from the mould, an extractor is provided having the shape of a sleeve surrounding the punch. On the extractor a forming surface is obtained that is suitable for shaping an end surface and an external side surface portion of the cap. The extractor is movable in motion of translation in relation to the punch, to exert on the cap a force that tends to release the cap from the punch. If the cap is provided with an internal thread that it is not possible to remove from the punch with an extractor that is movable only in motion of translation, the extractor is also provided with a rotation movement such as to follow a helicoidal trajectory that enables the cap to be unscrewed from the punch.

In order to rotate the extractor, the mould is provided with a plurality of gears that are moved by a sector arranged in a fixed position on the apparatus. In particular, the gears engage with the toothed sector only when the extractor has to be rotated in relation to the punch.

A drawback of the apparatuses for producing caps is connected with the mechanically complicated structure of the system for removing the cap from the punch at the end of the forming phase. In particular, it is difficult to synchronise the gears on the mould with the toothed sector arranged in a fixed position.

A further drawback of the apparatuses for producing caps is that they do not enable the values assumed by the process parameters during the productive cycle of a cap to be monitored. It is thus not possible to exercise precise and effect control of the different phases that follow one another during cap production.

An object of the invention is to improve the apparatuses and methods for producing objects, particularly by means of compression moulding.

A further object is to provide a test machine that enables the behaviour of the apparatuses for producing such objects industrially to be simulated with high precision. In particular, it is desired that in the test machine the behaviour of the arm and/or of the extruder, and/or of the actuator that moves a movable part of the mould in relation to a fixed part of the mould reproduce as faithfully as possible the operating methods of the apparatuses used during the industrial production of objects.

Another object is to provide an apparatus provided with a mould in which an object is formed, in which the methods of removal of the object from the mould are simplified.

Still another object is to provide an apparatus that enables the values assumed by certain process parameters during the production of an object to be monitored with great precision.

In a first aspect of the invention, an apparatus is provided comprising a transfer device rotationally drivable at a speed to transfer a dose of plastics from a supply device to a forming device of said dose, wherein with said transfer device a control device is associated that is suitable for varying said speed in a substantially continuous manner between a minimum value and a maximum value.

In an embodiment, the control device is associated with an electric driving device suitable for rotating the transfer device.

Owing to this aspect of the invention, it is possible to obtain an apparatus that enables the operating conditions of an apparatus for industrially producing objects from doses of plastics to be simulated with great precision. The control device in fact enables the rotation speed of the transfer device to be selected between a minimum and a maximum value and a rotation speed corresponding to the type and speed of production of the industrial production apparatus to be accordingly varied, the behaviour of which it is desired to stimulate.

In a second aspect of the invention, a method is provided comprising rotationally driving a transfer device for transferring a dose of plastics from a supply zone to a forming zone, wherein it furthermore comprises setting the value of at least an operating parameter of said transfer device.

In an embodiment, said setting comprises electrically checking said value.

In a further embodiment, said setting comprises selecting the speed at which said transfer device removes said dose from said supply zone.

In a still further embodiment, said setting comprises selecting the time that elapses between a first instant in which said transfer device removes said dose from said supply zone and a second instant in which said transfer device delivers said dose to said forming zone.

In another embodiment, said setting comprises selecting the relative speed between said transfer device and a forming device present in said forming zone, when said transfer device delivers said dose to said forming device.

The method according to this aspect of the invention enables a value of at least an operating parameter of the transfer device to be selected that is the same as the value that this parameter assumes in conditions of industrial production. In this way, it is possible to simulate with good approximation the operation of an apparatus for producing objects industrially.

In a third aspect of the invention, an apparatus is provided comprising a transfer device that is rotationally drivable to transfer a dose of plastics to a forming device comprising a first forming element and a second forming element, said first forming element being movable relative to said second forming means element along a stroke, an actuating device suitable for moving said first forming element towards said second forming element along said stroke for shaping said dose, wherein said actuating device is such as to drive said first forming element at a movement speed that is continuously variable between a minimum value and a maximum value, at any desired point freely chosen along said stroke.

In an embodiment, the actuating device comprises a fluid-dynamic actuating device drivable by an operating fluid.

In another embodiment, with the fluid-dynamic actuating device an adjusting element is associated to vary in a substantially continuous manner the flow rate of said operating fluid to said actuating device.

In a further embodiment the adjusting element comprises proportional servovalve.

In an alternative embodiment, the actuating device comprises electric actuating device.

The electric actuating device can be fitted in such a way as to drive the first forming element, directly or between the first forming element and the electric actuating device a transmission system can be interposed.

Owing to the third aspect of the invention, it is possible to obtain an apparatus in which the movement speed of the first forming element in relation to the second forming element can be modified at will. In this way, it is possible to simulate precisely the behaviour of the actuating device of an apparatus for producing objects from a dose of plastics industrially.

In a fourth aspect of the invention, there is provided a method comprising rotationally driving transfer device to transfer a dose of plastics from a supply zone to a forming device comprising a first forming element and a second forming element, said first forming element being movable relative to said second forming element along a stroke with a movement speed, moving said first forming element towards said second forming element along said stroke to obtain an object from said dose, wherein said movement speed is continuously variable between a minimum value and a maximum value at any desired point freely chosen along said stroke.

In an embodiment, said setting comprises selecting the duration of an approach interval that elapses between a first moment in which the dose is delivered to the first forming element and a second moment in which the first forming element brings the dose into contact with the second forming element.

In another embodiment, said setting comprises selecting the duration of a forming interval during which the dose fills a forming chamber defined between the first forming element and the second forming element.

In a further embodiment, said setting comprises selecting the duration of a detachment interval during which the first forming element moves away from the object.

In a still further embodiment, said setting comprises selecting the duration of a repositioning interval that elapses between an interval in which the first forming element is detached from the object and a further instant in which the first forming element is positioned in such a way as to be able to receive the dose.

Owing to the fourth aspect of the invention, it is possible to simulate with great precision the industrial production of objects from a dose of plastics. The method according to the fourth aspect of the invention enables one or more of the operating parameters of the forming device to be set at a value that is the one that this parameter assumes industrially.

In a fifth aspect of the invention, an apparatus is provided comprising an extruder provided with screw to convey plastics in an advance direction, a transfer device drivable to transfer a dose of said plastics from said extruder to a forming device of said dose, wherein said extruder comprises a moving device to selectively move said screw in said advance direction.

In an embodiment, said transfer device is rotationally drivable.

In a sixth aspect of the invention, a method is provided comprising extruding plastics by means of an extruder provided with a screw to convey said plastics in an advance direction, removing a dose of said plastics from said extruder and transferring said dose to a forming zone, wherein during said transferring there is provided moving said screw in said advance direction.

In a seventh aspect of the invention, an apparatus is provided comprising an extruder provided with a screw to convey plastics in an advance direction, a transfer device drivable to transfer a dose of said plastics from said extruder to a forming device of said dose, wherein downstream of said screw a chamber is provided to temporarily store said plastics.

In an embodiment, the transfer device is rotationally drivable.

In an eighth aspect of the invention, a method is provided comprising extruding plastics by of an extruder provided with a screw to convey said plastics in an advance direction, removing a dose of said plastics from said extruder and transferring said dose to a forming zone, wherein during said transferring there is provided temporarily storing said plastics in a chamber provided downstream of said screws.

Owing to the fifth, sixth, seventh and eighth aspects of the invention, it is possible to obtain an apparatus provided with an extruder that is able to simulate with great accuracy the behaviour of an extruder during the industrial production of objects from doses of plastics. The moving device according to the fifth aspect of the invention or the chamber according to the seventh aspect of the invention in fact enables the plastics to exit the extruder only when the transfer device is near the extruder to remove a dose from it, as occurs in the apparatuses used industrially and provided with a carousel having a plurality of forming devices.

In a ninth aspect of the invention, an apparatus is provided comprising a punch suitable for internally shaping an object provided with internal undercuts, an extracting device suitable for removing said object from said punch, wherein it furthermore comprises an electric motor for rotationally driving said extracting device around an axis.

In an embodiment, between the electric motor and the extracting device a gear transmission is interposed.

The electric motor can also be fitted in such a way as to move the extracting device directly.

In another embodiment, the extracting device is movable in motion of translation along said axis.

In a further embodiment, the extracting device comprises a sleeve surrounding said punch.

Owing to the electric motor, it is possible to avoid rotationally driving the extracting device by means of a toothed section fixed relative to a fixed part of the apparatus. The difficulties of synchronisation with the toothed sector in the prior-art apparatuses are thus overcome. For rotationally driving the extracting device, it is in fact sufficient to actuate the electric motor by means of a simple control that does not require any synchronisation between mechanical parts cooperating together.

In a tenth aspect of the invention, an apparatus is provided comprising a supply device for supplying plastics, a compression moulding device for forming an object from a dose of said plastics, and a transfer device drivable for transferring said dose from said supply device to said compression moulding device, a sensor arrangement for detecting at least an operating parameter of a movable part of said apparatus, a transmission system and a data acquisition centre for receiving a signal indicative of said at least an operating parameter from said transmission system, wherein said transmission system is selected from a group comprising: an optic transmission system, a radio transmission system.

The transfer device can be rotationally drivable.

In an embodiment, the sensor arrangement comprises a temperature sensor arrangement to detect the temperature of said compression moulding device.

The temperature sensor arrangement may comprise a thermocouple or a thermistor.

In an embodiment, the temperature sensor arrangement is associated with a punch of the compression moulding device. In particular, the temperature sensor arrangement can be arranged near a surface of the punch suitable for obtaining a threaded zone of the formed object.

In another embodiment, the temperature sensor arrangement is associated with a die of the compression moulding device. In particular, the temperature sensor arrangement can be arranged near a surface of the die suitable for obtaining an end wall of the formed object.

In an embodiment, the sensor arrangement comprises a temperature-detecting device associated with said transfer device.

The temperature-detecting device can be associated with a removal element fitted on the transfer device to remove the dose from the supply device.

The temperature-detecting device may comprise a thermocouple or a thermistor.

In an embodiment, the sensor arrangement comprises an angular position transducer associated with the transfer device to measure the angular position thereof.

The sensor arrangement may also comprise a rotation speed transducer associated with a transfer device to measure the rotation speed thereof around an axis.

In another embodiment, the sensor arrangement comprises a speed-detecting device associated with a screw of an extruder of said supply device to measure rotation speed of the screw.

In a further embodiment, the sensor arrangement comprises a position and/or speed and/or acceleration transducer associated with an actuating device arranged to move a first compression moulding element of said compression moulding device to a second compression moulding element of said compression moulding device.

The position transducer may comprise a potentiometer or an ultrasound transducer.

In a still further embodiment, the sensor device comprises a position and/or speed and/or acceleration detecting device associated with an extracting device cooperating with a punch of the compression moulding device to remove the formed object from the punch.

Owing to the sensor arrangement, the process of forming objects can be monitored that is actuatable by the apparatus according to the tenth aspect of the invention. The values of the parameters measured by the sensor arrangement can be used to retroactively modify the process or to extrapolate the laws that govern it, or to compare different production processes.

The invention can be better understood and implemented by reference to the attached drawings, which illustrate certain embodiments thereof by way of non-limitative example, in which.

Figure 1:
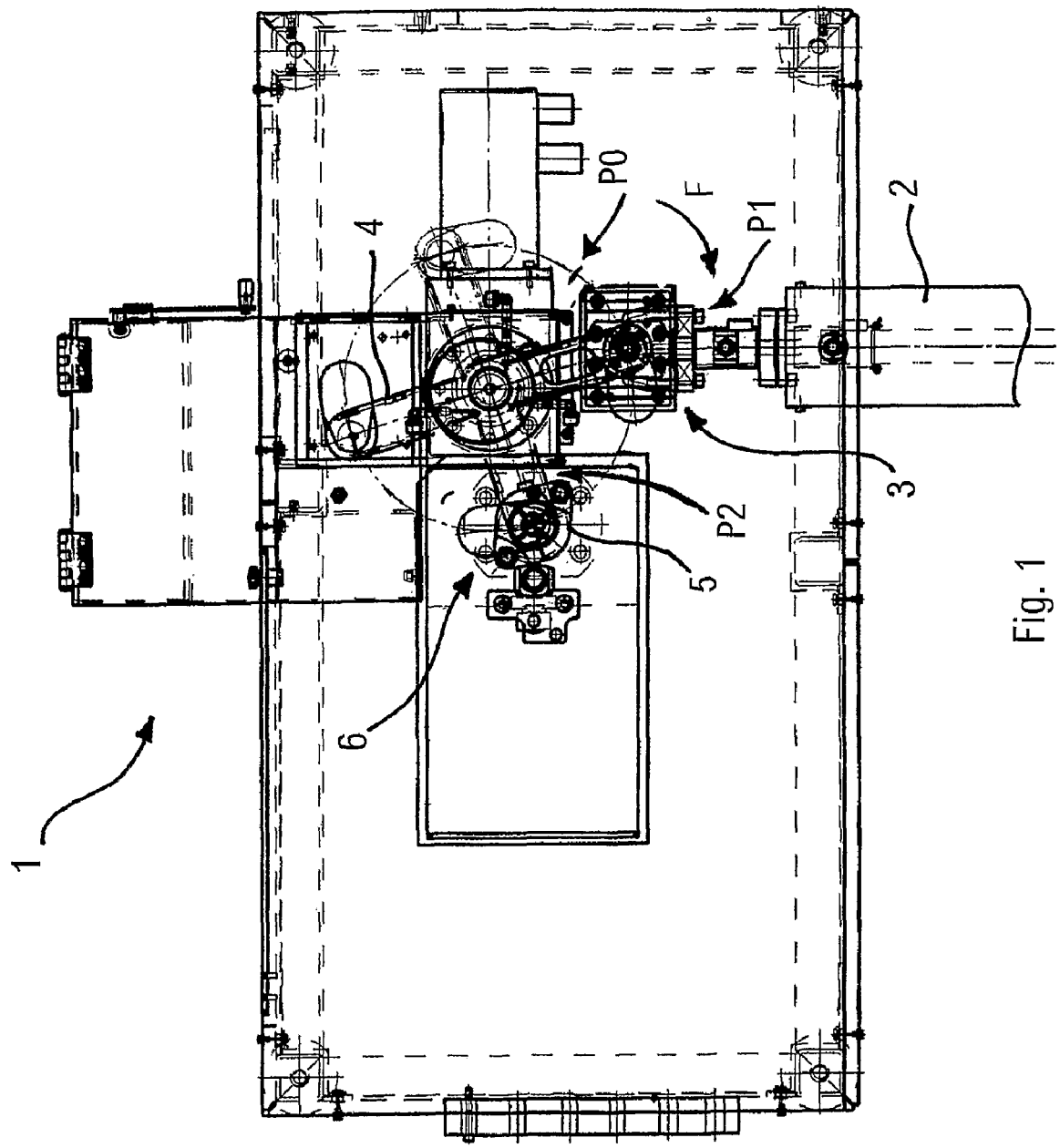
FIG. 1 is a plan view of a test apparatus for producing caps.

With reference to FIG. 1, a test apparatus 1 is shown that is suitable for forming objects, for example caps, by means of compression moulding of plastics. The test apparatus 1 can be used in a laboratory to simulate the conditions of industrial production, for example when it is necessary to study a new type of cap to analyse the behaviour of particular plastics, in a simplified manner compared with what would occur if an apparatus of the type used industrially were used.

The test apparatus 1 comprises an extruder 2, provided with an extrusion port arranged in a supply zone 3, from which plastics in viscous liquid state can exit. An arm 4 is furthermore provided that is rotationally movable in the direction of the arrow F around a rotation axis X that is perpendicular to the plane in FIG. 1 and is more clearly visible in FIG. 3. During its movement, the arm 4 reaches a removal position P1 in which it is arranged above the extrusion port to remove from the extruder 2 a dose of plastics having a preset weight. The arm 4 then reaches a delivery position P2, separated from the removal position P1 by an angle of approximately 90°. In the delivery position P2, the arm 4 is positioned at the forming device arranged in a forming zone 6 and comprising a mould 5. The dose is deposited inside the mould 5, which shapes it in such a way as to form a cap.

After depositing the dose in the mould 5, the arm 4 continues to rotate in the direction of the arrow F until it again reaches the removal position P1.

Figure 3:
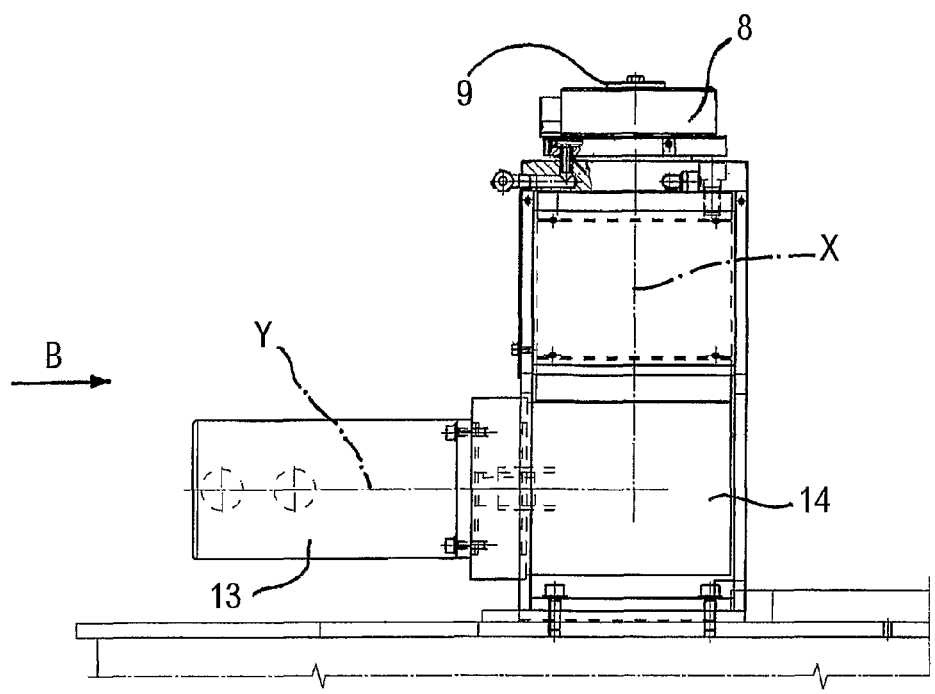
FIG. 3 is a side view taken along the direction of the arrow A in FIG. 2.
Figure 2:
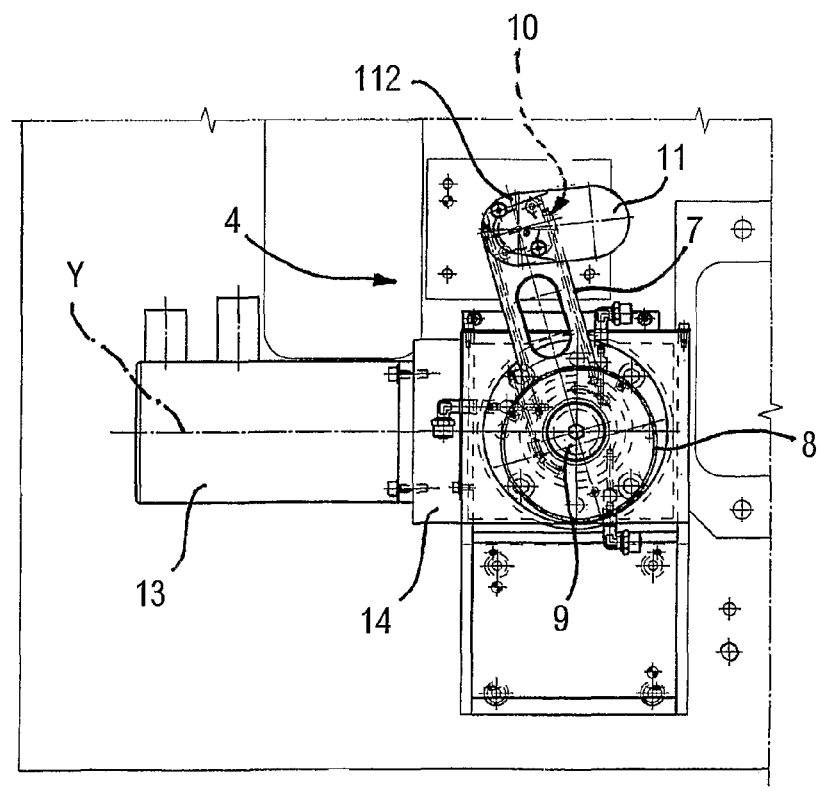
FIG. 2 is an enlarged view like the one in FIG. 1, showing an arm of the apparatus in FIG. 1.
Figure 4:
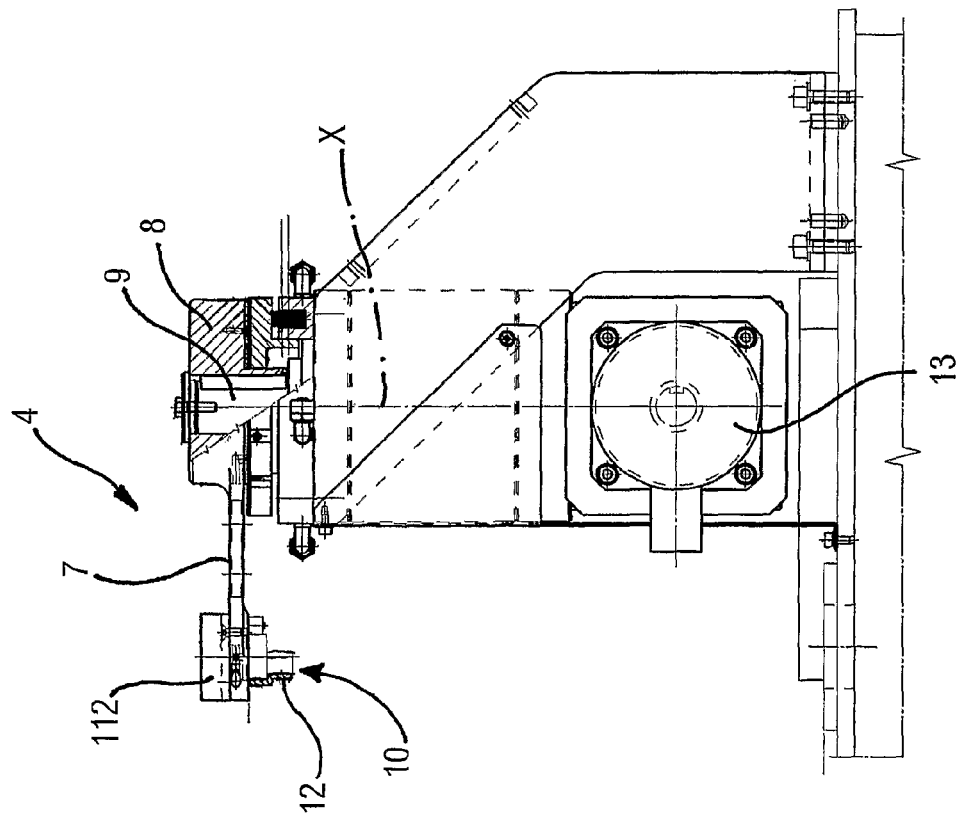
FIG. 4 is a side view taken along the direction of the arrow B in FIG. 3.

As shown in FIGS. 2 to 4, the arm 4 comprises a lever 7, which is integrally formed with a disc 8 that is rotatable around a pin 9 extending along the rotation axis X. At an end of the lever 7 opposite the one adjacent to the disc 8, a removal knife 10 is fixed that is suitable for removing the dose from the extrusion port, keeping it in contact with a "C"-shaped containing wall 12.

The containing wall 12 can be provided with one or more movable portions that enable the dose to be more easily removed from the knife 10 to be delivered to the mould 5. This wall can also be fixed rigidly to the removal knife 10 or in such a way as to enable a relative movement between the containing wall 12 and the knife 10.

The cutting profile of the knife 10 is arranged transversely to the exit direction of the plastics from the extrusion port, such that, when the knife 10 passes near the extrusion port, it removes a dose of plastics from the latter.

Above the containing wall 12, a plate 11 is provided that is suitable for supportingly receiving a cap. The plate 11 is delimited behind, in the direction of the arrow F, by a further containing wall 112.

The pivot 9 to which the arm is fixed 4 is rotationally driven around the axis X by an electric driving device comprising an electric motor 13 provided with a respective shaft extending along a motor axis Y. Between the pivot 9 and the electric motor 13 a movement transmission 14 is interposed that enables movement to be transferred from the shaft of the electric motor 13 to the pivot 9 in the desired manner.

The electric motor 13 is provided with a control device that enable the rotation speed of the shaft around the motor axis Y to be varied in a substantially continuous manner between a maximum value and a minimum value. In this way, also the rotation speed of the pivot 9 and therefore of the arm 4 around the rotation axis X is continuously variable. In particular, setting arm speed 4 according to a desired profile is possible, which profile, at least at certain points of the arm trajectory 4, reproduces the speed of a carousel for transferring a dose to an apparatus for the industrial production of caps.

Figure 6:
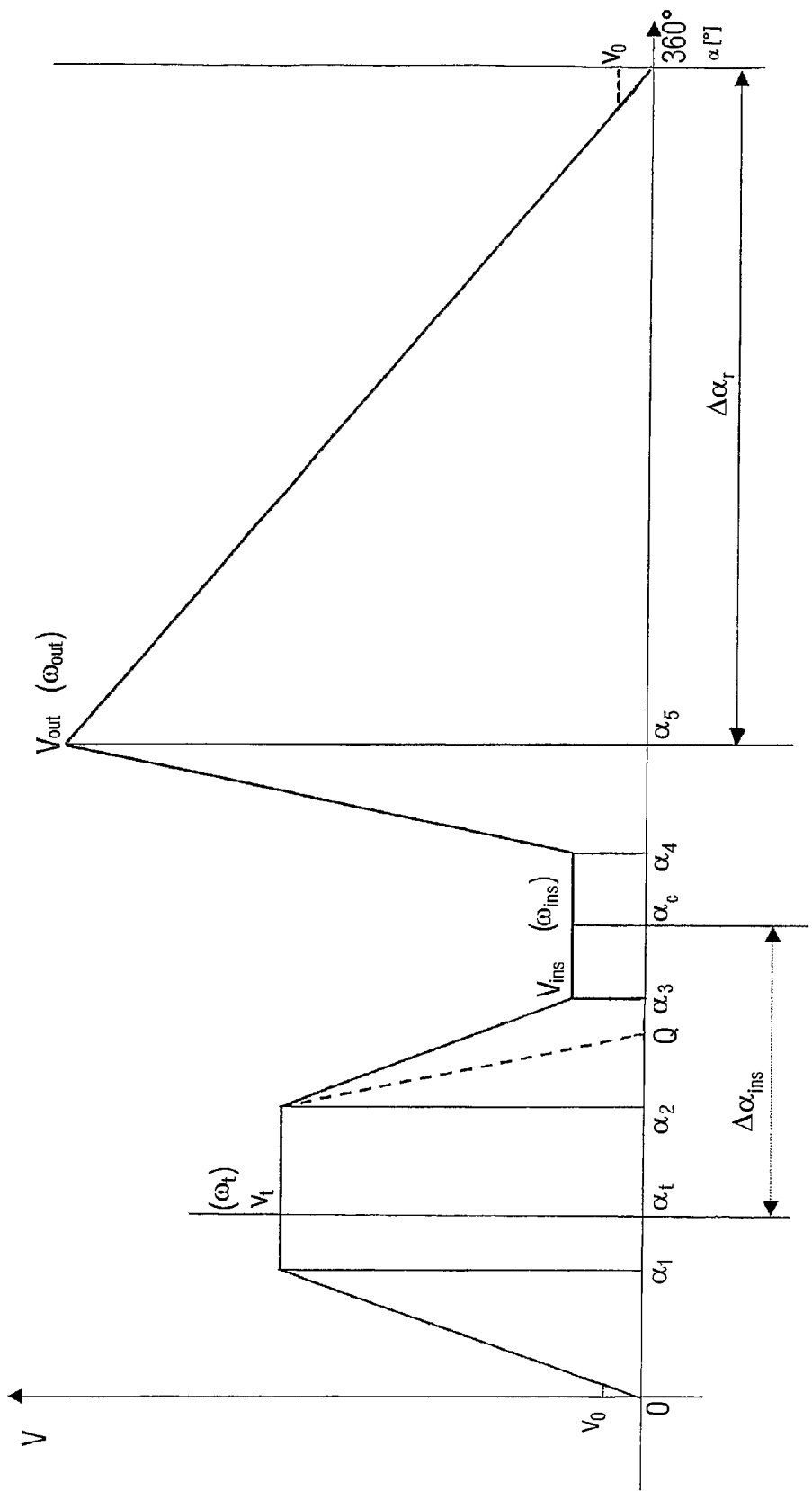
FIG. 6 is a graphic showing the speed of a removal knife fitted to the arm in FIG. 2.

FIG. 6 shows the speed variation of the arm 4 in function of its angular position. The speed of the arm 4, and therefore also of the removal knife 10 fixed to it, can be set owing to the control device associated with the electric motor 13.

Let us suppose that the test apparatus 1 is initially stationary and that the arm 4 is in an initial position P0, shown in FIG. 1, arranged upstream of the removal position P1. When the test apparatus 1 starts to operate, the speed of the arm 4 increases, going from the initial zero value to a value $v_t$ (cutting speed), which is reached in an angular position $\alpha_1$ of the arm 4, before the removal knife 10 starts to interact with the extrusion port in the removal position P1. A value of the angular cutting speed $v_t$ (angular cutting speed) of the arm 4 corresponds to the speed value $\omega_t$.

When the arm 4 reaches the removal position P1, the removal knife 10 removes a dose from the extrusion port. This occurs after the arm 4 has been rotated by a cutting angle $\alpha_t$ in relation to the initial position P0. In the removal position P1, the speed of the removal knife 10 is still equal to the value $v_t$.

After removing the dose from the extruder 2, the speed of the arm 4 is kept constant, equal to the value $v_t$, until a subsequent angular position $\alpha_2$. At this point, the speed of the arm 4 starts to decrease until it reaches a value $v_{ins}$ (insertion speed) at an angular position $\alpha_3$. Subsequently, the arm 4 moves to the delivery position P2, arranged at an angular distance $\alpha_c$ from the initial position P0, and releases the dose into an underlying die of the mould 5. The dose may be deposited into the die through the sole effect of gravity or by a pneumatic device, for example comprising an air jet, or by a mechanical device. It is also possible to use any combination of the force of gravity and/or of the mechanical device and/or of the pneumatic device.

In the delivery position P2, the speed of the arm 4 is still equal to the value $v_{ins}$, to which an angular speed $\omega_{ins}$ corresponds.

The interval of time that elapses between the instant in which the arm 4 reaches the removal position P0, corresponding to the angle $\alpha_r$, and the subsequent instant in which the arm 4 reaches the delivery position P1, corresponding to the angle $\alpha_c$, is called the insertion interval and is indicated by the symbol $T_{ins}$. During this interval, the arm 4 has performed a rotation $\Delta\alpha_{ins}$.

When the arm 4 is still in the delivery position P2, an extractor, which will be disclosed more fully below, removes the cap formed in the previous cycle by a punch of the mould 5, the punch being arranged above the die. The cap is collected from the plate 11 associated with the removal knife 10 and is then conveyed by the arm 4 to an evacuation zone in which it is removed from the arm 4 by known methods. After delivering the dose to the mould 5, the arm 4 moves away from the mould by initially moving at a speed equal to the insertion speed $v_{ins}$. This speed value is maintained still to a subsequent angular position $\alpha_4$ in which the speed of the arm 4 starts to increase to a maximum value $v_{out}$ that is reached in an angular position $\alpha_5$ and to which an angular speed $\omega_{out}$ corresponds. In the interval between $\alpha_4$ and $\alpha_5$ inside the mould 5 the dose is shaped so as to obtain a cap for bottles.

After the arm 4 has passed through the angular position $\alpha_5$, its speed starts to decrease and it progressively approaches the initial position P0. If the test apparatus 1 stops after producing the cap, the speed of the arm 4 decreases until it reaches value zero. This occurs after the arm 4 has performed a rotation of 360° and has returned to the initial position P.0. During the cooling interval $\Delta\alpha_r$ that elapsed between the angular position $\alpha_5$ and the initial position P0, the cap that has just been formed has remained inside the mould 5 to be cooled and to consolidate its shape. When the arm 4 has returned to the initial position P0, the mould 5 opens and the cap is extracted from it. The test apparatus 1 is now ready to start a new cycle according to the ways disclosed above.

If it is not wished to stop the test apparatus 1 between the production of a cap and that of the next cap, during the cooling interval $\Delta\alpha_r$, it is possible to diminish the speed of the removal knife 10 until it reaches a value $v_0$ that is greater than zero, as indicated in FIG. 6 with a dotted line. Obviously, in this case also the speed at which a new cycle starts will be the same as the value $v_0$.

The speed values, and consequently also the time intervals, disclosed above with reference to the production cycle of a cap by the test apparatus 1 can be set at the desired value owing to the control device associated with the electric motor 13.

In particular, it has been seen experimentally that the test apparatus 1 enables the conditions of industrial production of caps to be reproduced in the laboratory with great precision if:

a cutting speed value $v_t$ is selected that is the same as the value at which a dose is removed from the extruder during industrial production. This value is usually the same as the rotation speed of a transfer carousel of an apparatus for industrial use, which, once the production speed of the caps and the type of apparatus have been set, moves at a constant angular speed;

an insertion interval value $T_{ins}$ is selected that is the same as the duration of the time that elapses industrially between the moment in which a dose is removed from the extruder and the time in which it is inserted into the mould;

an insertion speed value $v_{ins}$ is selected that is equal to the value that the corresponding speed between the mould and the carousel for transferring the dose assumes in conditions of industrial production at the instant at which the dose is delivered to the mould.

As far as the insertion speed in particular is concerned, it is noted that in the industrial production of caps, when a dose is delivered by the transfer carousel to the mould, the relative speed between transfer carousel and mould may be zero. Accordingly, also in the test apparatus 1 it is possible to set the insertion speed $v_{ins}$ at the lowest possible value, at most to a zero value as shown by the dotted line that in FIG. 6 intersects the abscissas-axis at point Q.

By appropriately selecting the $v_{ins}$, $T_{ins}$ and $v_t$ values it is possible to simulate in the laboratory the behaviour of different apparatuses for the industrial production of caps operating at nominal speeds that are different from one another.

FIG. 6 shows only a possible speed profile of the arm 4 in function of its angular position. It is nevertheless possible to also adopt other speed profiles of the arm 4. In particular, in the portions comprised between 0 and $\alpha_1$, $\alpha_2$ and $\alpha_3$, $\alpha_4$ and $\alpha_5$, $\alpha_5$ and 360°, the speed of the arm 4 might also vary in a non-linear manner.

Figure 7:
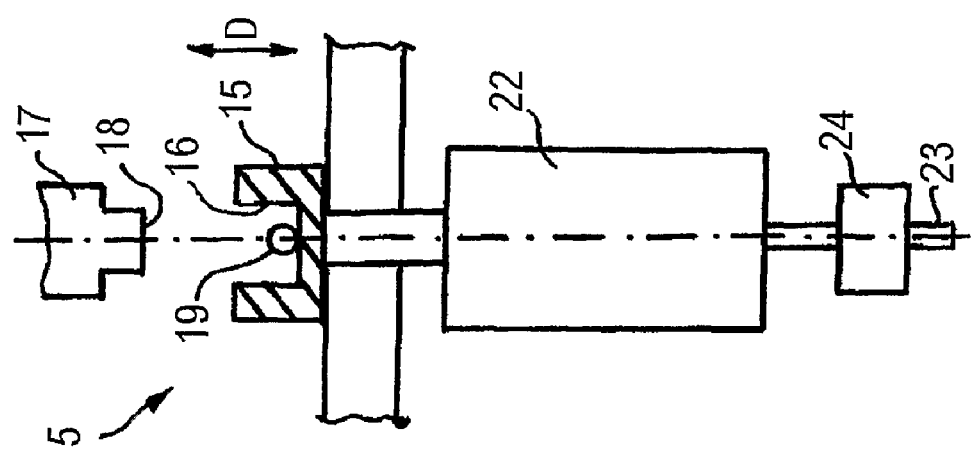
FIG. 7 is a partially sectioned schematic view of a forming device of the apparatus in FIG. 1 in an opening position.

As shown in FIG. 7, the mould 5 comprises a first forming element that includes a die 15, in which a forming cavity is obtained 16 that reproduces the external shape of the cap. The mould 5 furthermore comprises a second forming element, provided with a punch 17 delimited by a forming surface 18 that reproduces the internal shape of the cap. The die 15 and the punch 17 are movable in relation to one another between an opening position, shown in FIG. 7 and a closing position, shown in FIG. 9. In the opening position, the die 15 and the punch 17 are spaced apart from one another in such a way that it is possible to insert between them a dose 19 of plastics to be formed. In the closing position on the other hand, the die 15 is brought into contact with the punch 17 to define a forming chamber 20 in which a cap 21 is shaped.

To obtain a relative movement between the die 15 and the punch 17, it is possible to maintain the punch 17 in a fixed position and move the die 15 by an actuating device in a direction indicated by the arrow D that may, for example, be vertical. In particular, the die 15 can be arranged underneath the punch 17 so that the dose 19 falls from the removal knife 10 into the forming cavity 16 underneath and then interferes with the punch 17 when the die 15 goes to the closing position.

The actuating device is such as to actuate the die 15 at a movement speed that is variable in a substantially continuous manner between a minimum value and a maximum value. For this purpose, the actuating device may comprise a hydraulic actuator 22 that is drivable by an operating fluid coming from a supply line 23. Along the supply line 23 an adjusting element is arranged that is suitable for regulating the flow rate of the operating fluid entering the hydraulic actuator 22. In particular, the adjusting element comprises a proportional servovalve 24, having a shutter that can assume any intermediate position between a first position in which the valve is completely shut and a second position in which the valve is completely open. By modifying the position of the shutter, it is possible to modify the flow rate of operating fluid to the hydraulic actuator 22, and thus vary the movement speed of the die 15 in the direction D. In this way, the die 15 can be driven at a desired speed profile that reproduces the operation of industrially used apparatuses.

Figure 10:
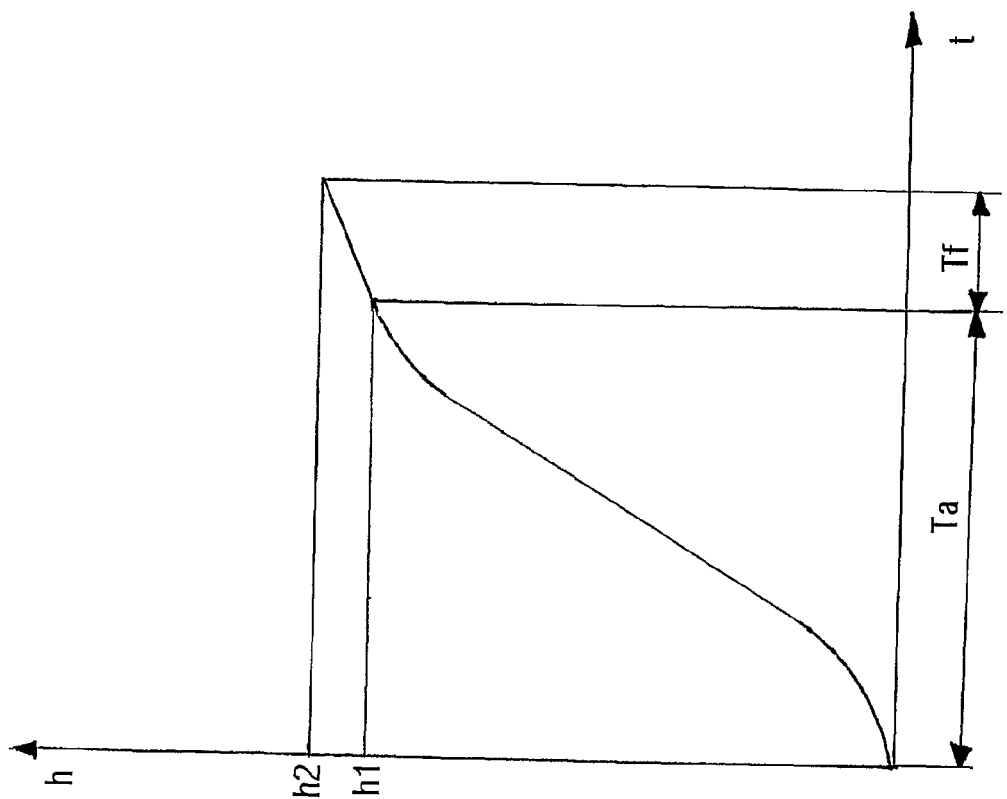
FIG. 10 is a graphic showing the stroke of a die of the forming device in FIG. 7, during a phase of approach to a punch.

FIG. 10 shows how the shift h of the die 15 varies during an approach stroke to the punch 17, in function of the time, according to a particular movement mode of the die 15 by the hydraulic actuator 22. The origin of the graphic shown in FIG. 10 corresponds to the opening position shown in FIG. 7, in which the die 15 is at the greatest distance from the punch 17. From this point, the die 15 approaches the punch 17 until it reaches the moulding start position shown in FIG. 8, in which the dose 19 housed in the forming cavity 16 is in contact with the punch 17. This occurs at the end of an approach interval $T_a$ during which the die 15, starting from the position of the greatest distance from the punch 17, has performed a stroke h1 bringing the dose 19 into contact with the punch 17.

Figure 9:
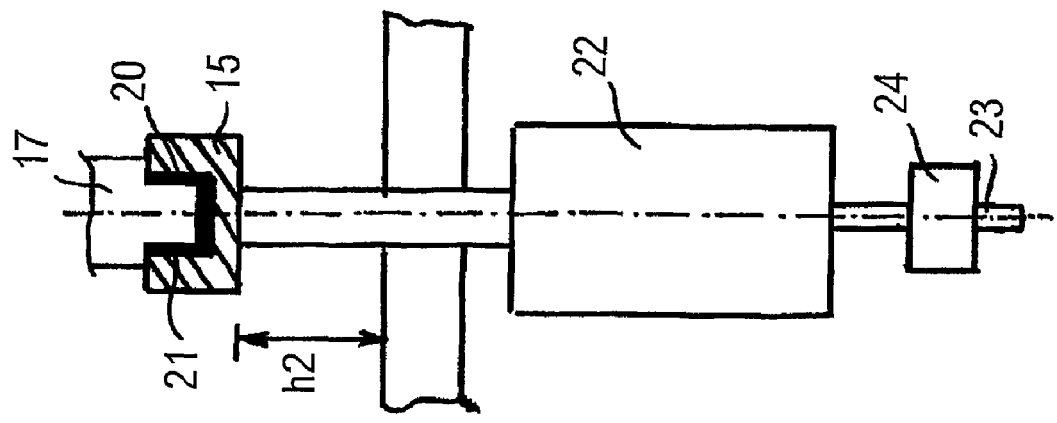
FIG. 9 is a view like the one in FIG. 7, showing the forming device in a closing position.

From the moulding start position, the die 15 continues to approach the punch 17, crushing the dose 19, which is distributed inside the forming cavity 16. During this phase, the die 15 can move more slowly than occurred during the approach interval $T_a$, so as to shape the cap correctly. The die 15 stroke finishes when the closing position shown in FIG. 9 is reached, in which the die 15 is brought into contact with the punch 17. The instant in which the closing position is reached also coincides with the end of moulding, in which cap forming is completed, which nevertheless still remains in the mould to be cooled and consolidate its shape. Between the instant in which the moulding start position is reached and the moulding end instant there is a forming interval $T_f$ at the end of which the die 15 moves by an amount h2 in relation to the opening position indicated in FIG. 7.

Figure 11:
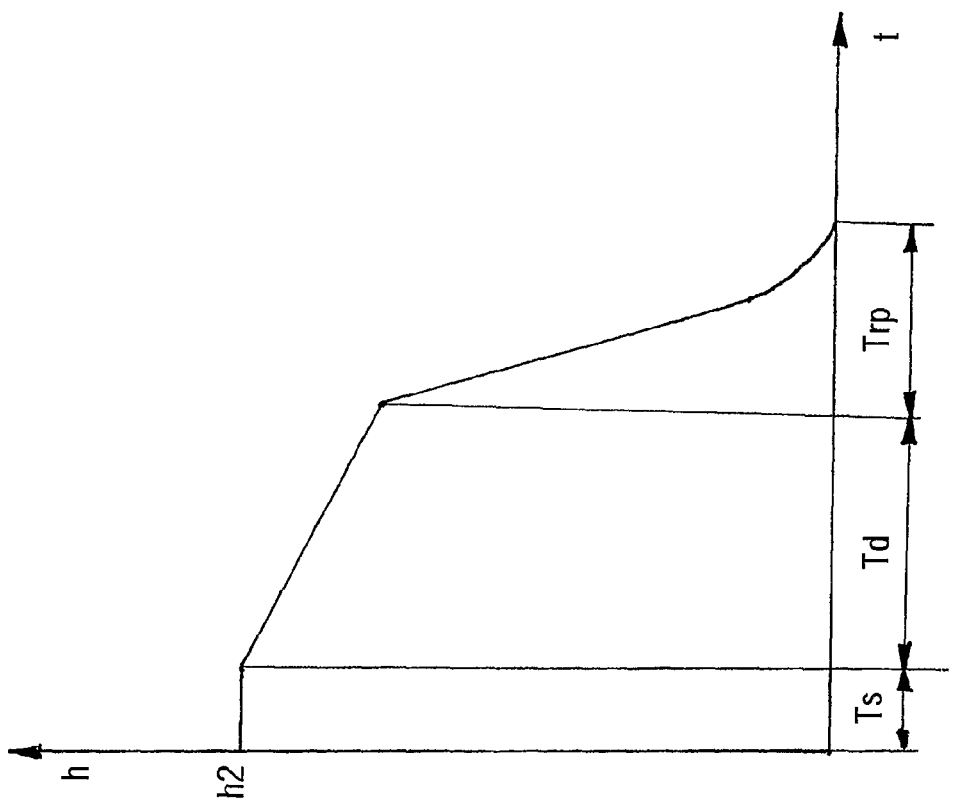
FIG. 11 is a graphic like the one in FIG. 10, showing the stroke of the die during a phase of distancing from the punch.

As illustrated in FIG. 11, the die 15 remains in the closing position for a stabilisation interval $T_s$ during which the cap 21 cools and its shape is stabilised. At the end of the stabilisation interval $T_s$, the die 15 starts to move away from the punch 17 at a relatively low detachment speed to prevent damage to the cap 21 when the die 15 separates from it. At the end of a detachment interval $T_d$, the die 15 is completely detached from the cap 21.

Subsequently, the die 15 can move away from the punch 17 more rapidly as there are no more risks of damage to the cap 21. At the end of a repositioning interval $T_{rp}$, which is subsequent to the detachment interval $T_d$, the die 15 returns to the opening position shown in FIG. 7.

The proportional servovalve 24 enables the speed of the hydraulic actuator 22 and therefore the die 15 to be adjusted in such a way that the aforementioned intervals assume preset values. In particular, to faithfully introduce the behaviour of an apparatus for the industrial production of caps, it is possible to adjust the flow rate of operating fluid that traverses the proportional servovalve 24 in such a way that the intervals of time mentioned with reference to FIGS. 10 and 11 assume the same values assumed by the corresponding intervals in conditions of industrial production.

Experiments have shown that in order to reproduce with good precision the behaviour of an industrial production apparatus, it is advisable that the following operating parameters are set in the test apparatus 1 at a value that is assumed industrially by the following parameters:
the approach interval $T_a$;
the forming interval $T_f$;
the detachment interval $T_d$;
the repositioning interval $T_{rp}$.

By selecting the value of the intervals listed above, it is possible to simulate the behaviour of different types of machine operating at production speeds that differ from one another.

It should be noted that the position of the die 15 according to time may also vary according to a law that is different from the one shown in FIGS. 10 and 11. In particular, the speed pattern of the die 15 in relation to the die may not be linear.

To determine when the die 15 is in the opening and/or closing position and to appropriately modify the speed of the hydraulic actuator 22, it is possible to equip the test apparatus 1 with a first sensor, which detects the reaching by the die 15 of the opening position, and with a second sensor that detects reaching of the closing position.

The first and the second sensor can also be replaced by a position transducer, for example of the optical line reader type.

The signals received by the first sensor and by the second sensor, or by the position transducer, are used to regulate the position of the shutter in the proportional servovalve 24.

A PLC is furthermore provided to synchronise the opening and the closing of the mould with the arm movements 4.

In an alternative embodiment, instead of the hydraulic actuator 22 it is possible to use an electric actuator, for example of the linear type, with a corresponding control to regulate the speed of the die 15, as disclosed above with reference to FIGS. 7 to 11.

The electric actuator can be fitted in such a way as to directly drive the die, or between the die and the electric actuator a transmission system can be interposed.

The latter may comprise a reduction gear, a feed screw or any other system of known type.

In an embodiment that is not shown, the actuating device could be used to move the punch keeping the die in a fixed position. It is also possible to move both the die and the punch, associating with both respective actuating device of the type disclosed previously.

In another embodiment that is not shown, direction D may not be vertical, but be, for example, horizontal or tilted.

The test apparatus 1 may be equipped with an extruder of the traditional type, i.e. provided with a screw that rotates around its own longitudinal axis, remaining in an axially fixed position.

Figure 12:
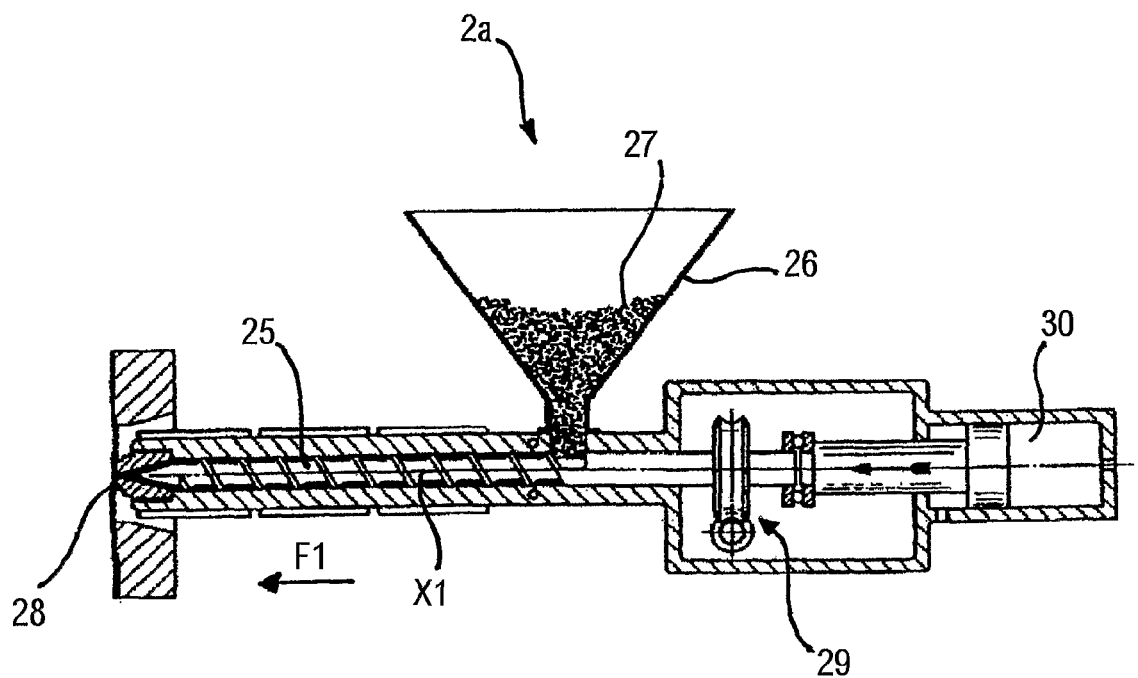
FIG. 12 is a schematic side view of an extruder that is part of the apparatus in FIG. 1.
Figure 13:
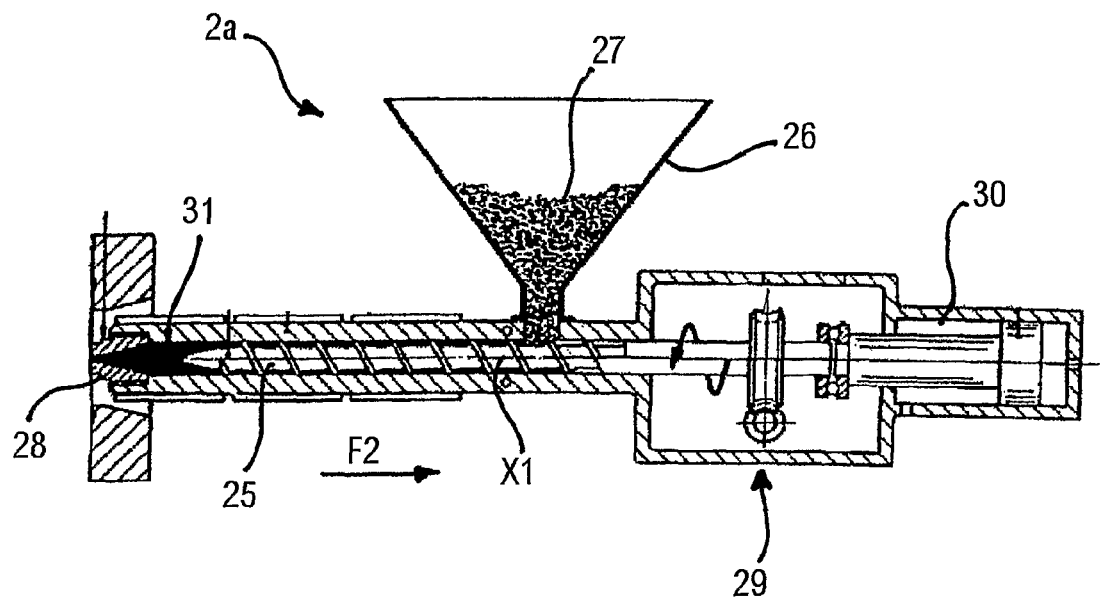
FIG. 13 is a view like the one in FIG. 12, showing a retracted configuration of the screw of the extruder.

To simulate with greater precision the behaviour of an apparatus of industrial production, it is nevertheless possible to adopt a modified extruder, of the type shown in FIGS. 12 and 13 and indicated by the reference number 2a. The extruder 2a comprises a screw 25, rotatable around an axis X1 and suitable for melting plastics supplied in the form of granules 27 through a hopper 26. Plastics are conveyed in an advance direction F1 to an extrusion port 28 from which plastics exit in a viscous liquid state. A gearmotor 29 enables the screw 25 to be rotationally driven around the axis X1.

The extruder 2a furthermore comprises a moving device for moving the screw 25 in motion of translation parallel to the advance direction F1. The moving device may comprise a dual-effect hydraulic cylinder 30.

During operation of the test apparatus 1, after the removal knife 10 has removed a dose from the extrusion port 28, the moving device drives the screw 25 in motion of translation in a direction F2 moving it away from the extrusion port 28, as shown in FIG. 13. The screw 25 thus reaches a retracted position in which, even if the screw 25 continues to rotate around the axis X1, the plastics do not exit the extrusion port 28, but tend to accumulate in an accumulation zone 31 defined downstream of the screw 25 and upstream of the extrusion port 28. The accumulation zone 31 is provided with a heating device that is not shown.

When the arm 4, rotating around the axis X, returns near the removal position P1 in which the removal knife 10 removes a dose from the extrusion port 28, the moving device 30 takes the screw 25 to the supply position shown in FIG. 12. In this position, the screw 25 is adjacent to the extrusion port 28. By moving the screw 25 from the retracted position to the supply position, the screw performs a sort of injection, pushing the plastics contained in the accumulation zone 31 outside the extrusion port 28.

When the arm 4 takes the removal knife 10 up to near the extruder 2a, the hydraulic cylinder 30 moves the screw 25 in the direction F2 from the retracted position to the supply position. The screw 25 pushes the plastics present in the accumulation zone 31 outside the extrusion port 28, so that the removal knife 10 can remove the dose.

In this way the plastics can exit the extruder 2a only when the arm 4 is near the removal position, at a speed approximately the same as the speed at which the plastics exit from an extruder of an apparatus for the industrial production of caps.

Figure 14:
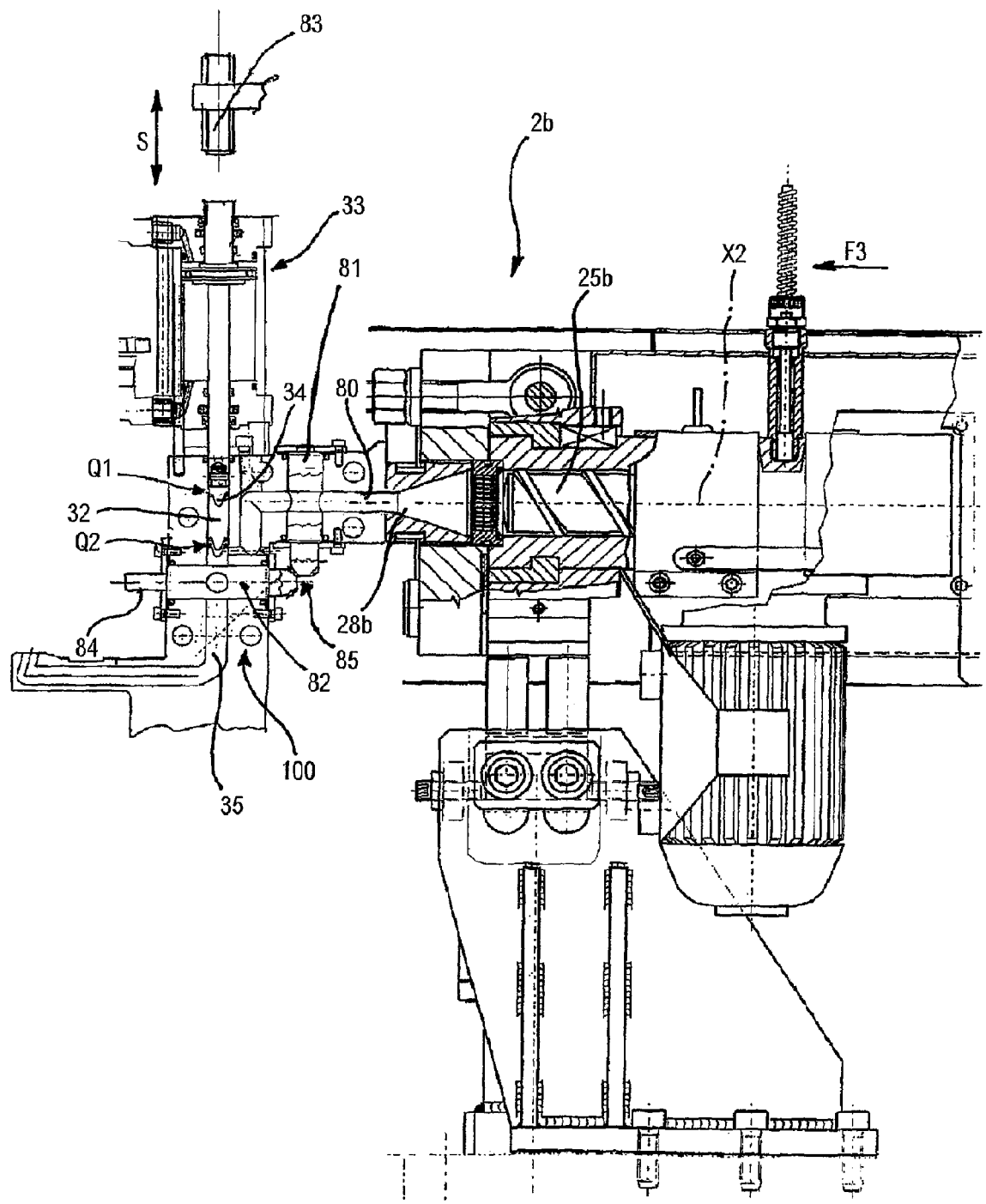
FIG. 14 is a partially sectioned side view of an alternative embodiment of an extruder of the apparatus in FIG. 1.

The FIG. 14 shows an alternative embodiment of the extruder of the test apparatus 1, shown by the reference number 2b.

The extruder 2b comprises a screw 25b, rotatable around an axis X2 to push plastics in a viscous liquid state in an advance direction F3. Downstream of the screw 25b, an extrusion port 28b is provided from which a first conduit 80 extends along which a first on-off valve 81 is arranged. The latter is provided with a shutter movable between a closed configuration in which the plastics cannot exit the extrusion port 28b, and an open configuration, shown in FIG. 14, in which the extrusion port 28b is in communication with an accumulation chamber 32. In this chamber the plastics can be temporarily stored whilst it wait to be conveyed outside the extruder 2b.

With the accumulation chamber 32 a heating device 100 is associated that enables the accumulation chamber 32 to be kept at a desired temperature, preventing the plastics stored therein from reaching excessive viscosity.

The accumulation chamber 32 is provided with a thrust device 33 that is distinct from the screw 25b and acts in a thrust direction S that is transverse to the axis X2. In particular, the thrust device 33 may comprise a respective actuator provided with a piston 34 defining a surface of the accumulation chamber 32.

The piston 34 is movable between a retracted position Q1 and an extended position Q2, in such a way as to vary the volume of the accumulation chamber 32. In the retracted position Q1, the piston defines a volume of the accumulation chamber 32 corresponding to approximately the volume of a dose. This volume may be filled by the plastics coming from the first conduit 80.

Downstream of the accumulation chamber 32 a second conduit 35 is provided through which the plastics can exit the extruder 2b. A second on-off valve 82, which is completely similar to the first on-off valve 81, is interposed between the accumulation chamber 32 and the second conduit 35. The first on-off valve 81 and the second on-off valve 82 are connected together by a connecting member such that, when the first on-off valve 81 is in the closed configuration, the second valve 82 is in the open configuration, and vice versa. The connecting member may comprise a conical pair 85. The first on-off valve 81 and the second on-off valve 82 can be operated simultaneously by a control device comprising for example an actuating rod 84 fixed relative to the shutter of the second on-off valve 82.

During operation, the first on-off valve 81 is initially in the open configuration whilst the second on-off valve 82 is in the closed configuration. In this way, the plastics that exit the extrusion port 28b traverse the first conduit 80 and fill the accumulation chamber 32, shifting the piston 34 to the retracted position Q1. This position is reached when the piston 34 touches a stop device comprising, for example, a stop element 83 arranged in an adjustable position.

When the plastics have filled the accumulation chamber 32, the first on-off valve 81 is closed so as to isolate the screw 25b from the accumulation chamber 32. To prevent excessive pressure developing in the zone of the extrusion port 28b whilst the first on-off valve 81 is shut the screw 25b can be temporarily stopped or removed from the extrusion port 28b.

Simultaneously, the second actuating valve 82 is opened, putting the accumulation chamber 32 in communication with the second conduit 35. The piston 34 then goes to the extended position Q2, so as to push the plastics contained in the accumulation chamber 32 outside the extruder 2b, where the dose can be removed by the arm 4.

Subsequently, the first on-off valve 81 is opened, the second on-off valve 82 is closed and a new cycle can start in the manner described above.

The piston speed 34, and therefore the time taken for a dose to exit the extruder 2b, can be set freely, regardless of the rotation speed of the screw 25b. In this way it is possible to make the plastics exit the second conduit 35 only during a preset interval of time and at a desired speed, in conditions similar to those that occur in an apparatus for the industrial production of caps.

Figure 15:
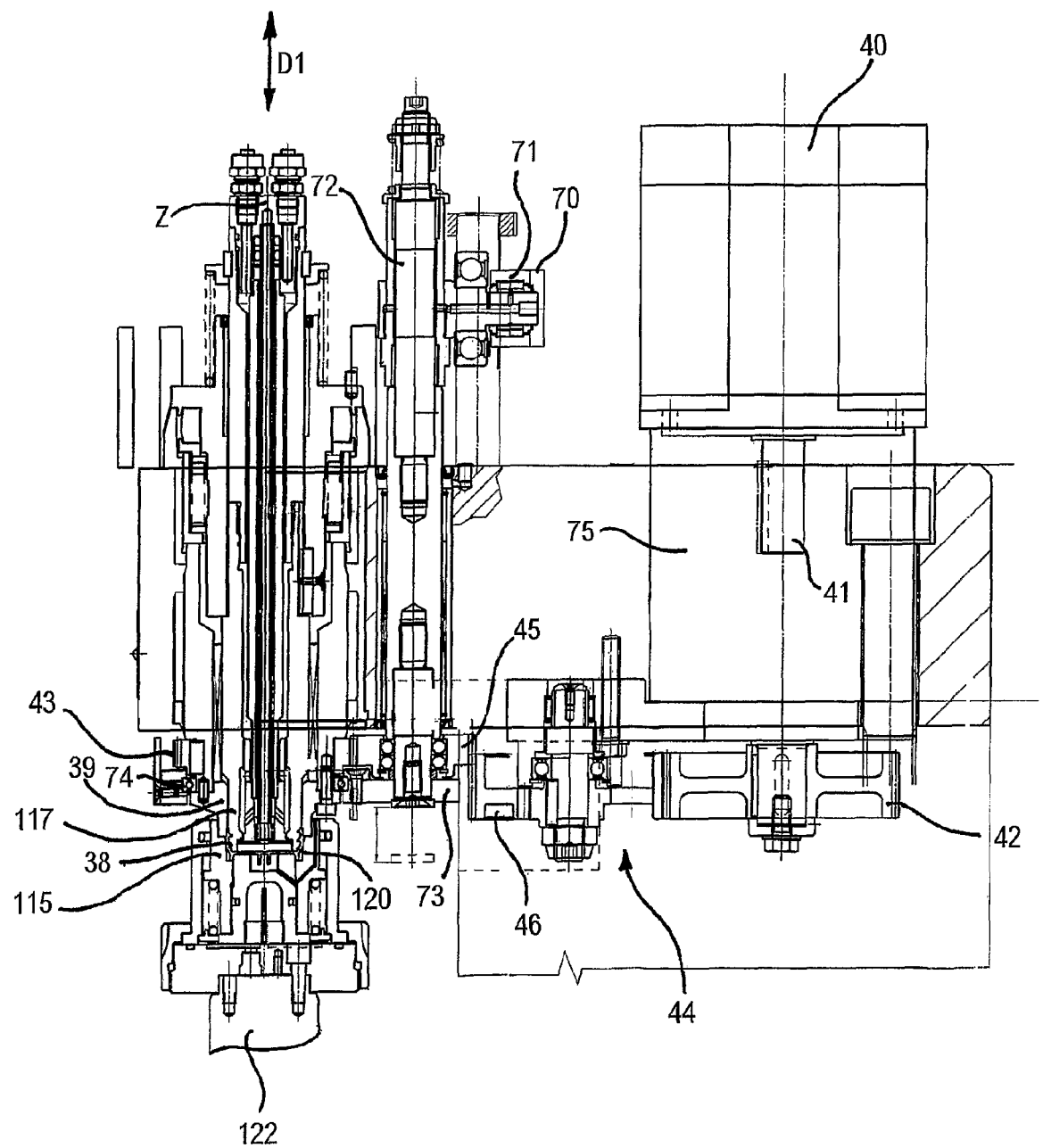
FIG. 15 is a partially sectioned side view of a forming device of an apparatus for producing caps.

With reference to FIG. 15, a forming device of an apparatus for producing caps is shown, which can be used both in a test apparatus intended to be used in a laboratory and in an apparatus intended to be used industrially.

The forming device comprises a die 115 that is drivable in motion of translation in direction D1 by an actuator 122, in such a way as to approach a punch 117 to define a forming chamber 120 in which a cap can be formed. The punch 117 is provided with a lateral forming surface suitable for obtaining a thread or an internal undercut inside the cap.

When, after forming a cap, the actuator 122 removes the die 115 from the punch 117, the cap remains connected to the punch 117 owing to the thread or the internal undercut that engages with the lateral forming surface. To remove the cap from the punch 117, an extractor 39 is provided that is sleeve-shaped, that surrounds the punch 117 engaging with a portion of external side wall of the cap.

The extractor 39 is movable in motion of translation in the direction D1 owing to a cam-type driving device. This device comprises a cam provided with a track 70 in which a roll 71 engages that is fixed relative to a rod 72. A fork 73 is connected to an end of the rod 72, opposite the further end of the rod to which the roll 71 is fixed. The fork 73 supports the extractor 39, which is fitted to the fork 73 in such a way as to make the relative motion of translation impossible.

A bearing 74, interposed between the fork 73 and the extractor 39, enable the latter to rotate around an axis Z parallel to the direction D1, when the extractor 39 is driven by an electric motor that will be described in detail below. By combining the motion of translation movement with the rotation movement, the extractor 39 describes a helicoidal movement along the axis Z, which is transmitted to the cap owing to the friction forces that develop between the end of the extractor 39 that engages with the cap and the external side surface of the latter. The cap is unscrewed from the punch 117 thus.

The electric motor that rotationally drives the extractor 39 may comprise a brushless motor 40 provided with a motor shaft 41 to which a toothed driving wheel 42 is connected, via an interposed reduction gear 75. A driven toothed wheel 43 is fixed to the extractor 39. Between the toothed driving wheel 42 and the driven toothed wheel 43 a gear transmission 44 is interposed, comprising a first toothed wheel 45, which engages with the driven toothed wheel 43, and a second toothed wheel 46, which engages with the toothed driving wheel 42. When the extractor 39 is driven in motion of translation in the direction D1, the first toothed wheel 45 moves in motion of translation together with the extractor 39, sliding along the face of the second toothed wheel 46. In particular, the first toothed wheel 45 may perform a stroke K that corresponds to the stroke of the extractor 39, along which the first toothed wheel 45 continues to engage with the second toothed wheel 46, so that the brushless motor 40 can rotate the extractor 39.

To remove a cap from the punch 117 after the die 115 has detached itself therefrom it is sufficient to activate the brushless motor 40, which in turn rotationally drives the extractor 39. The brushless motor 40 is arrested when, owing to the helicoidal movement of the extractor 39, the cap has separated from the punch 117. In this way the difficulties of synchronisation of the gear transmission with the toothed sector of the prior art are avoided.

In an embodiment that is not shown, it is possible to interpose a different type of transmission from gear transmission between the electric motor and the extractor.

In another embodiment, which is also not shown, the electric motor, and in particular the brushless motor, can be fitted directly on the axis Z of the extractor, without interposing any transmission.

Figure 16:
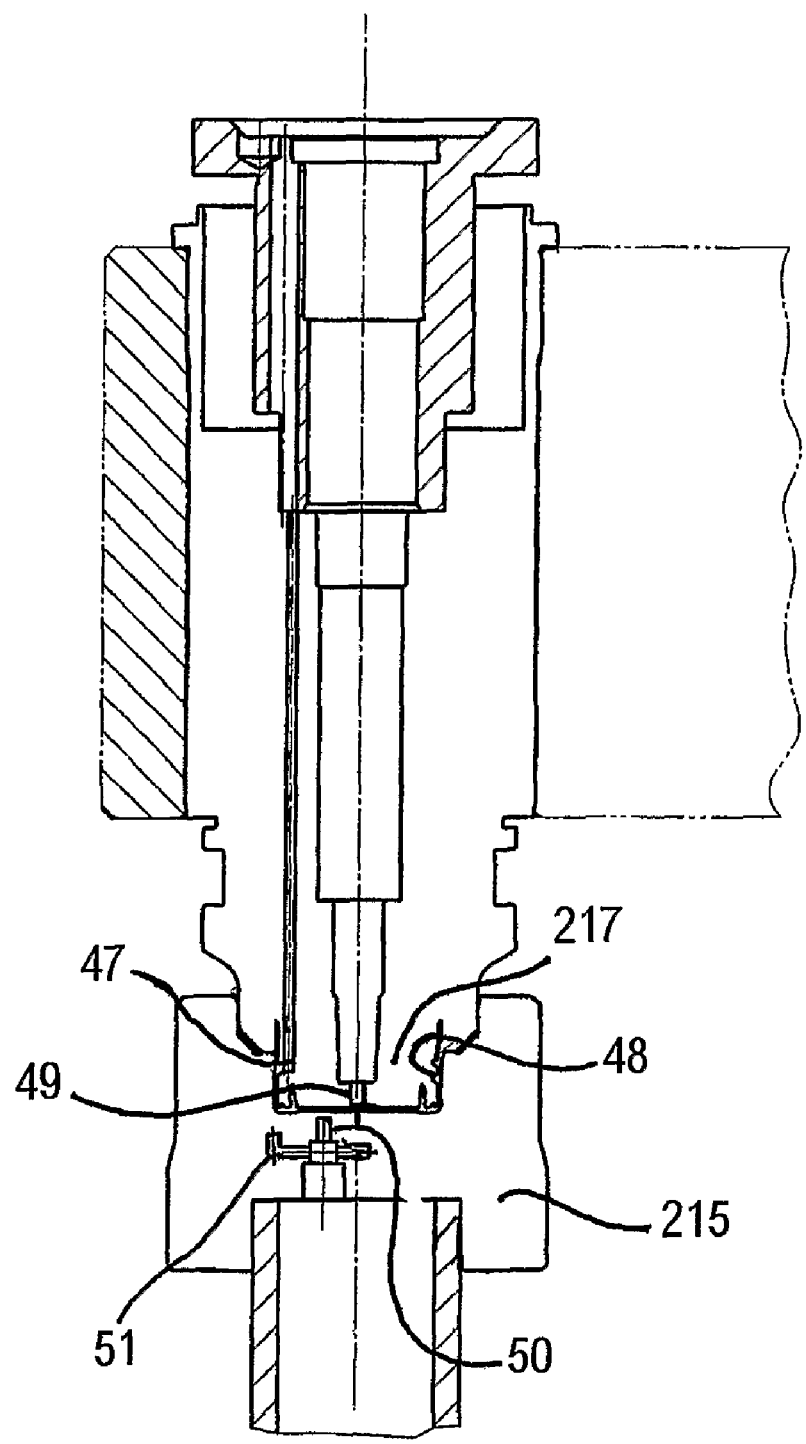
FIG. 16 is a partially sectioned side view of a forming device provided with a temperature sensor arrangement.

The FIG. 16 shows a forming device comprising a mould 205 for producing a cap, which can be fitted on both a test apparatus intended to be used in a laboratory, and on an apparatus for industrial production.

Figure 8:
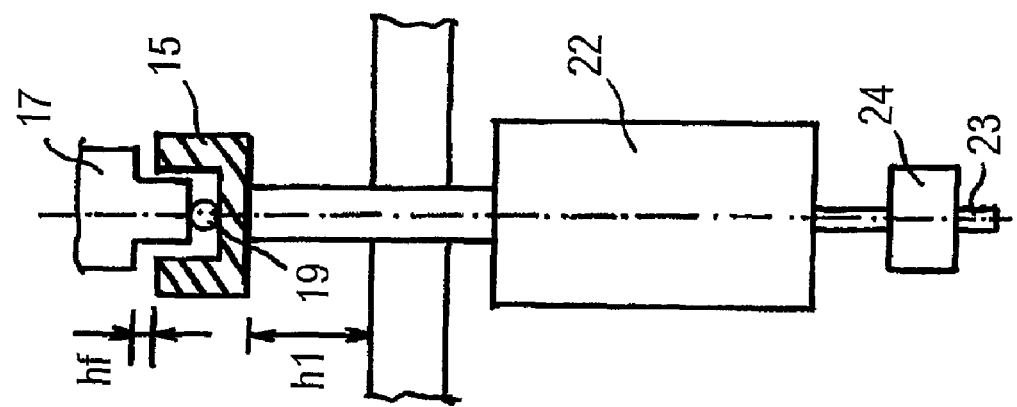
FIG. 8 is a view like the one in FIG. 7, showing the forming device in an intermediate position.

The forming device comprises a die 215 and a punch 217, completely similar to those disclosed previously with reference to FIGS. 7 to 9. With the mould 205 a temperature sensor arrangement is associated that enables the temperature to be measured at preset points of the mould.

The temperature sensor arrangement may comprise a first temperature sensor 47, associated with the punch 217 and positioned near a threaded forming surface 48 of the punch 217, by means of which it is possible to obtain an internal thread on the cap. The first temperature sensor 47 detects the temperature on the thread of the cap or near any tamper ring adjacent to the thread. These zones are particularly delicate because if they are inappropriately heat-treated, they are subject to tears that may occur when the cap is removed from the punch or in a subsequent cutting phase intended to obtain a cutting line that makes it possible to separate the cap from the tamper ring.

The temperature sensor arrangement may comprise, alternatively or in addition to the first temperature sensor 47, a second temperature sensor 49, associated with the punch 217 to measure the temperature of a bottom wall of the cap. This temperature is in fact indicative of the temperature of the mould 205.

Alternatively or in addition to the first temperature sensor 47 and/or the second temperature sensor 49, a third temperature sensor 50 may be present, associated with the die 215, and arranged near the bottom of the forming cavity obtained therein. By means of the third temperature sensor 50, it is possible to measure the temperature of the bottom wall of the cap, from the external part of the cap.

Lastly, the temperature sensor arrangement may comprise, alternatively or in addition to one or more of the temperature sensors disclosed previously, a fourth temperature sensor 51 positioned inside the body of the die 215. Also the fourth temperature sensor 51 provides an indicative value of the temperature of the mould 205.

The temperature sensors 47, 49, 50 and 51 may each comprise a thermocouple or a thermistor.

Figure 17:
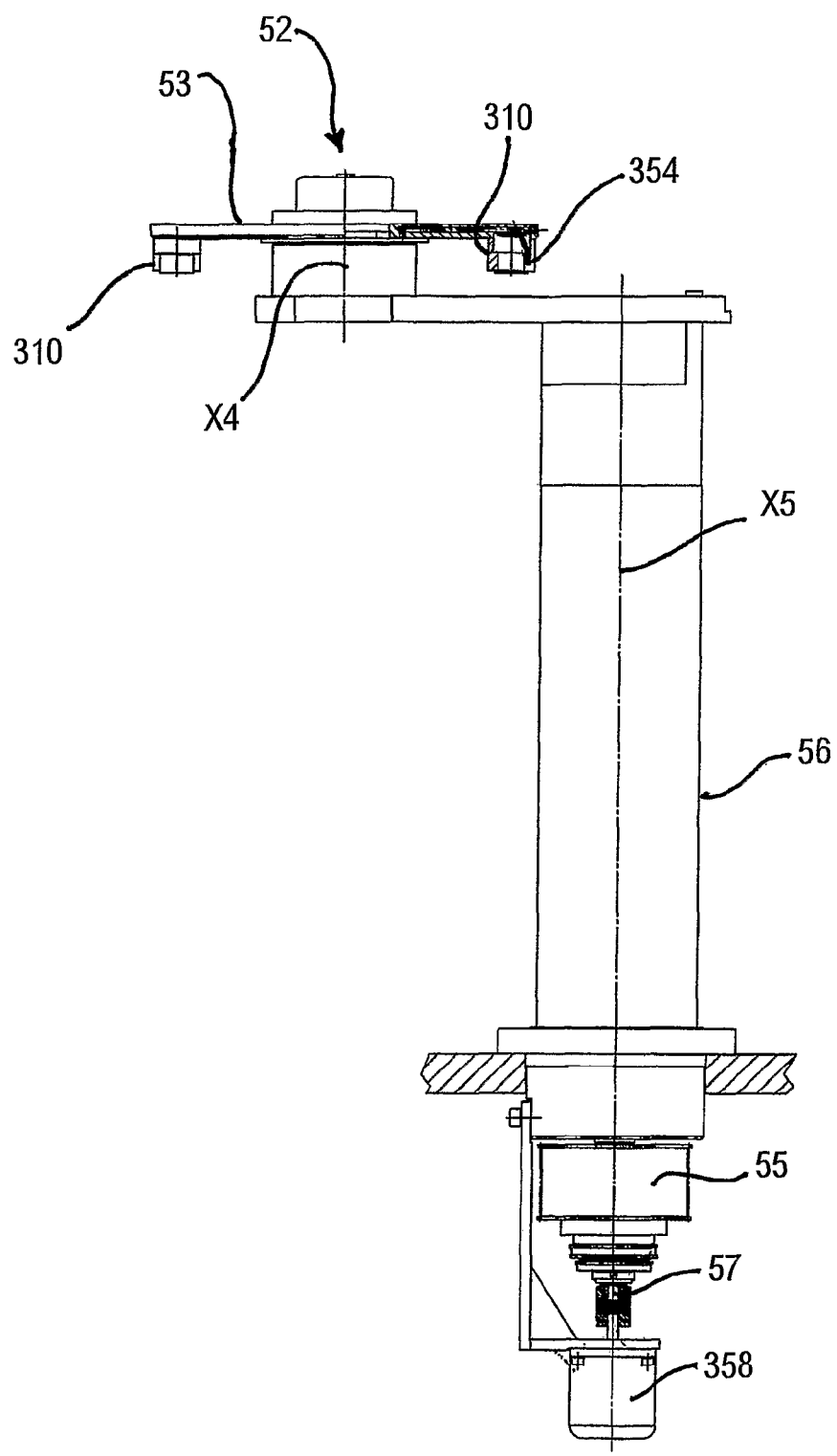
FIG. 17 is a partially sectioned schematic side view of a transfer device provided with a sensor arrangement in an apparatus for producing caps.

FIG. 17 shows that, in addition or as an alternative to the sensor arrangement disclosed with reference to FIG. 16, it is possible to provide a temperature-detecting device associated with a transfer device of the dose between the extruder and the mould. The transfer device illustrated in FIG. 17 comprises a transfer carousel 52, rotationally movable around an axis X4, which in the example in FIG. 4 is vertical and comprising a plate 53 provided below with a plurality of removal knives 310 arranged on the periphery of the plate 53. During the rotation of the transfer carousel 52, each knife 310 interacts in sequence with an extruder that is not shown to remove a dose therefrom. The latter is then delivered to a corresponding mould that is not shown.

Transfer carousels of the type shown in FIG. 17 are usually used in the apparatuses for the industrial production of caps.

As shown in FIG. 17, each spoon 310 is provided with a temperature-detecting device 354 comprising for example a thermocouple or a thermistor, which enables for example the temperature of the dose to be measured whilst the latter is transferred from the extruder to the mould.

It is furthermore possible to provide an angular position transducer and/or a speed transducer suitable for detecting the angular position and/or the speed of the transfer carousel 52, as disclosed below.

The transfer carousel 52 is rotationally driven around the axis X4 by a gearbox that is not shown that transmits movement to the axis X4 from a driving shaft 57 arranged inside a support 56, extending along an axis X5. On the driving shaft 57 a pulley 55 is shrunk that is rotationally driven by a belt that is not shown.

To the driving shaft 57 an encoder 358 is connected, which enables the angular position or the speed of the driving shaft 57 to be detected and therefore, as the transmission ratio is known, also enables the angular position or the speed of the transfer carousel 52 to be detected.

Instead of the encoder 358 it is possible to use another angular position and/or speed transducer, for example a brushless motor.

Figure 5:
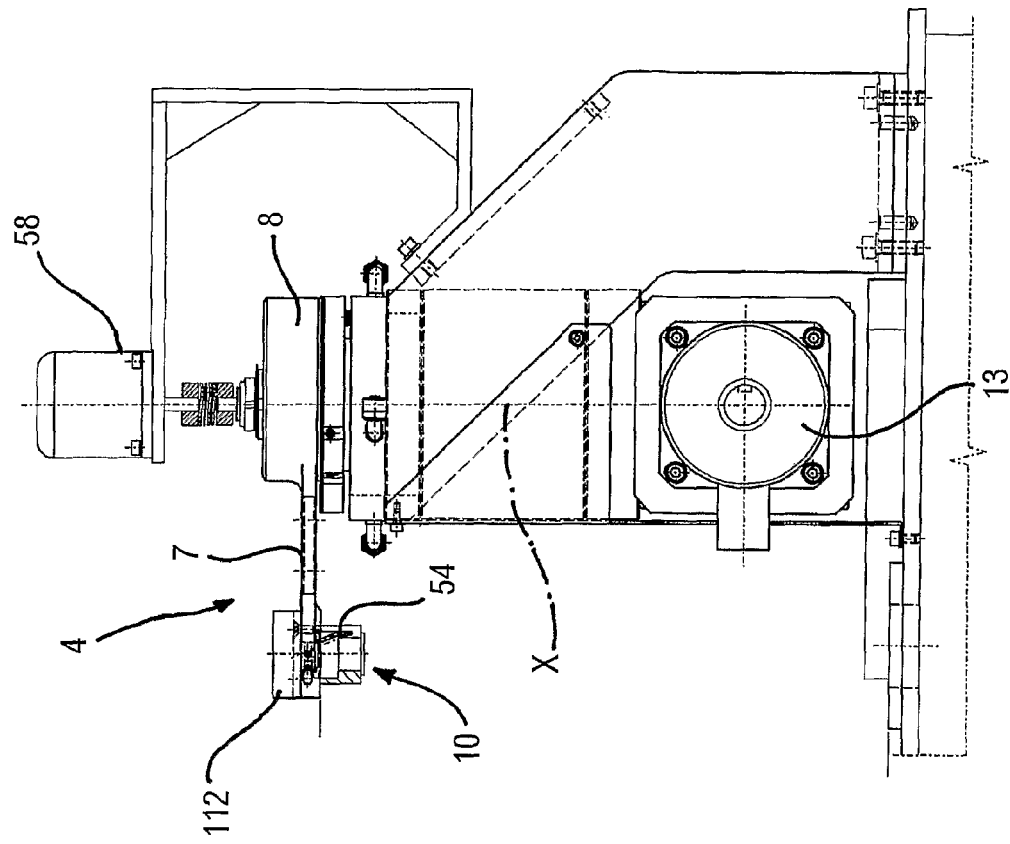
FIG. 5 is a view like the one in FIG. 4, showing an alternative embodiment of the test apparatus.

An arrangement of sensors of the type shown in FIG. 17 can also be used in a test apparatus, as shown in FIG. 5.

With the removal spoon 10 fitted on the arm 4 a temperature-detecting device 354 can in fact be associated, comprising for example a thermocouple or a thermistor.

Similarly, it is possible to provide an angular position transducer and/or speed transducer such as an encoder 58, for measuring the angular position and/or the rotation speed of the pivot around which the arm 4 rotates.

Figure 18:
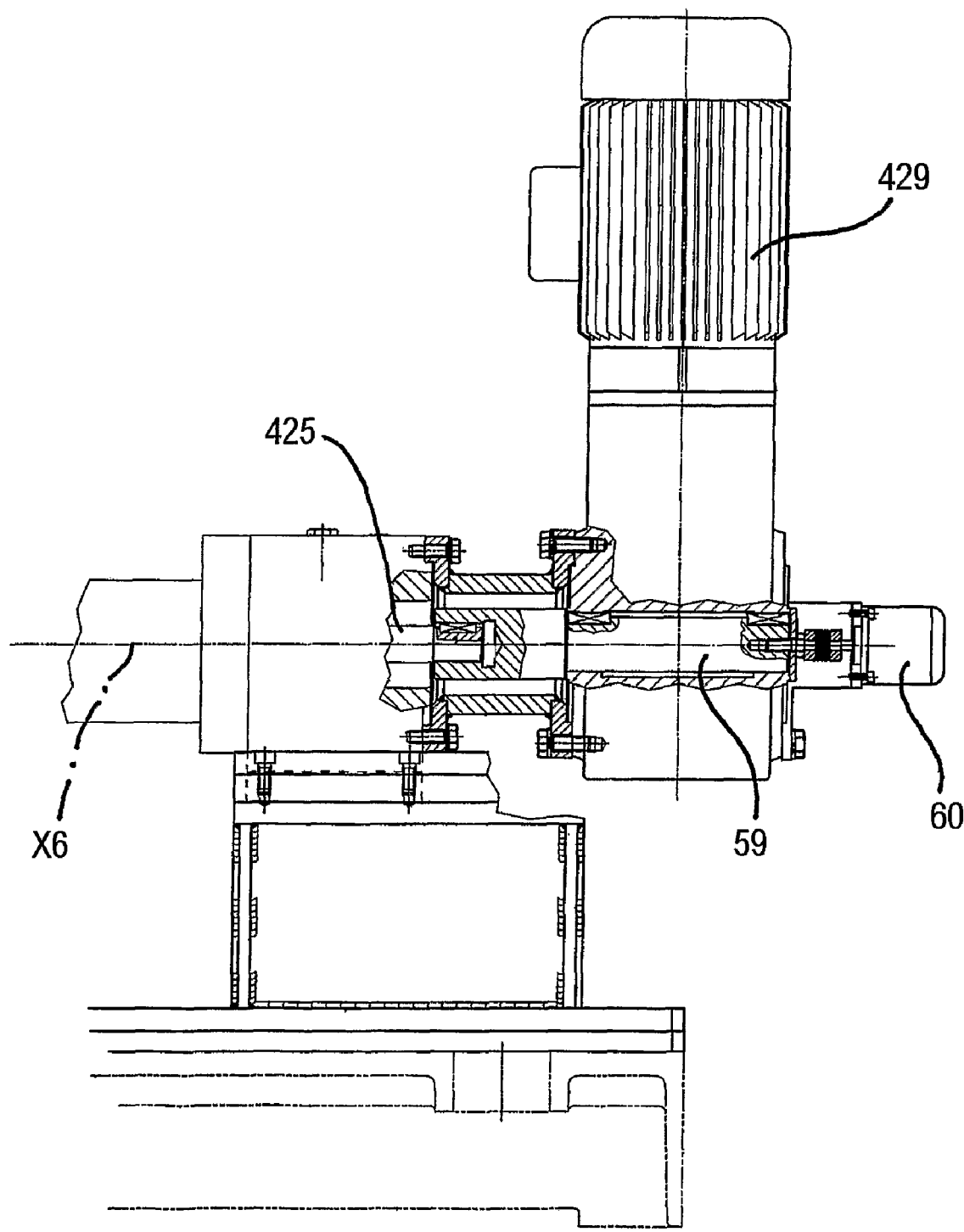
FIG. 18 is a partially sectioned side view of a speed-detecting device associated with a extruder of an apparatus for producing caps.

FIG. 18 shows a portion of the extruder that enables the plastics to be melted and supplied with which the doses are formed. This extruder, which can be inserted into an apparatus for producing caps intended for industrial or laboratory use, comprises a screw 425 rotationally driven around an axis X6 by a gearmotor 429. The latter moves an extrusion shaft 59 on which the screw 425 is shrunk. A speed-detecting device 60 suitable for detecting the rotation speed of the screw 429 is connected to the extrusion shaft. The speed-detecting device 60 may comprise, for example, an encoder, a brushless motor or any other speed transducer. It may furthermore be connected to the screw 425 in any manner, it may for example be shrunk directly on the screw 425 or be associated with it by a transmission arrangement.

Figure 19:
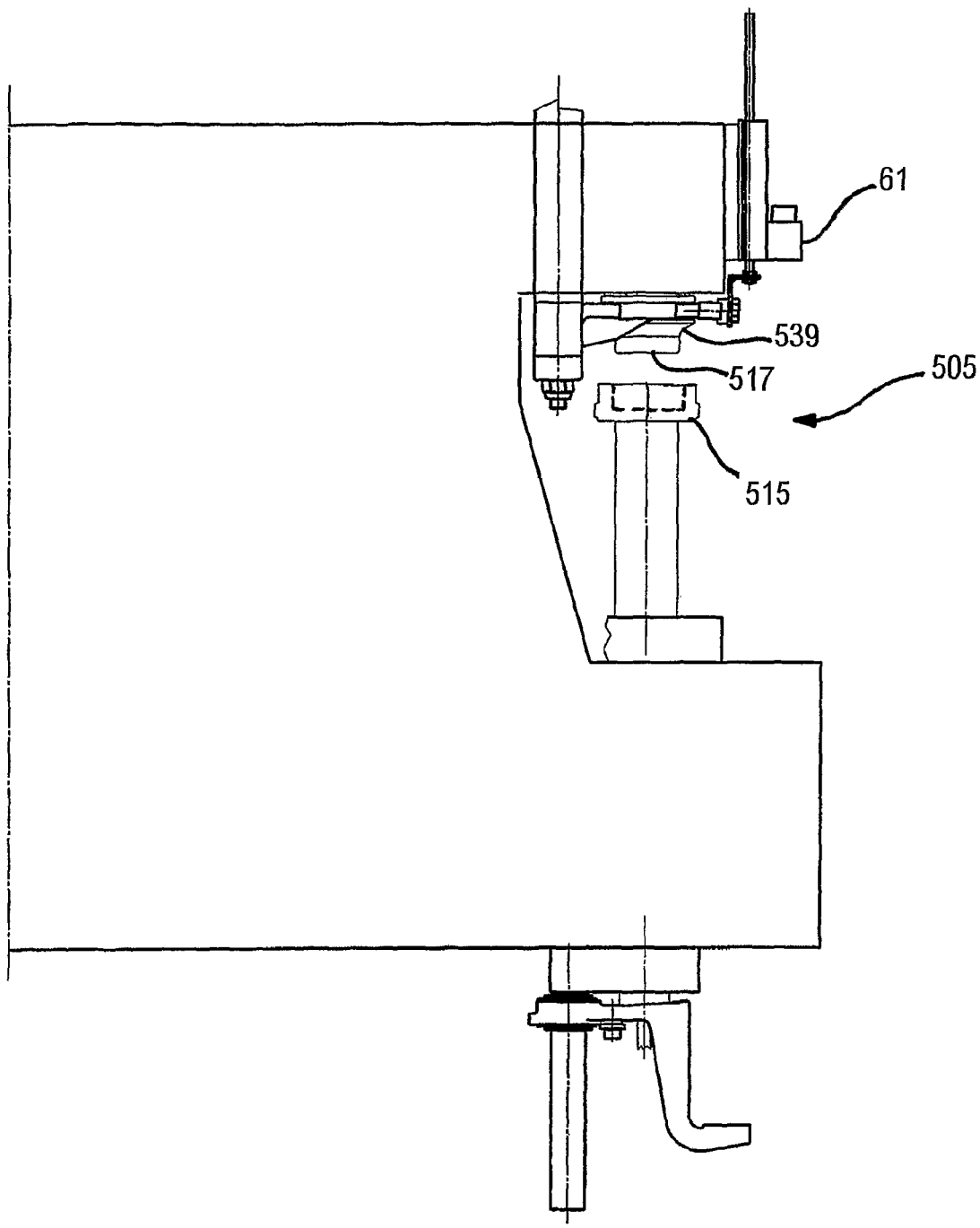
FIG. 19 is a partially sectioned schematic side view a of forming device provided with an extracting device with which a position and/or speed and/or acceleration transducer is associated.

With reference to FIG. 19, a forming device is shown comprising a mould 505 provided with a die 515 and with a punch 517, that can be included in an apparatus for the industrial production of caps or in a test apparatus intended to simulate the industrial production of caps. With the punch 517 an extractor 539 is associated that is movable in relation to the punch 517 to remove from it a formed cap, in a similar manner to those disclosed with reference to FIG. 15.

Position and/or speed and/or acceleration detectors are fitted fixed relative to the extractor 539 comprising a linear transducer 61 that enables the position and/or the speed and/or the acceleration of the extractor 539 to be detected whilst the latter moves in relation to the punch 517.

Figure 20:
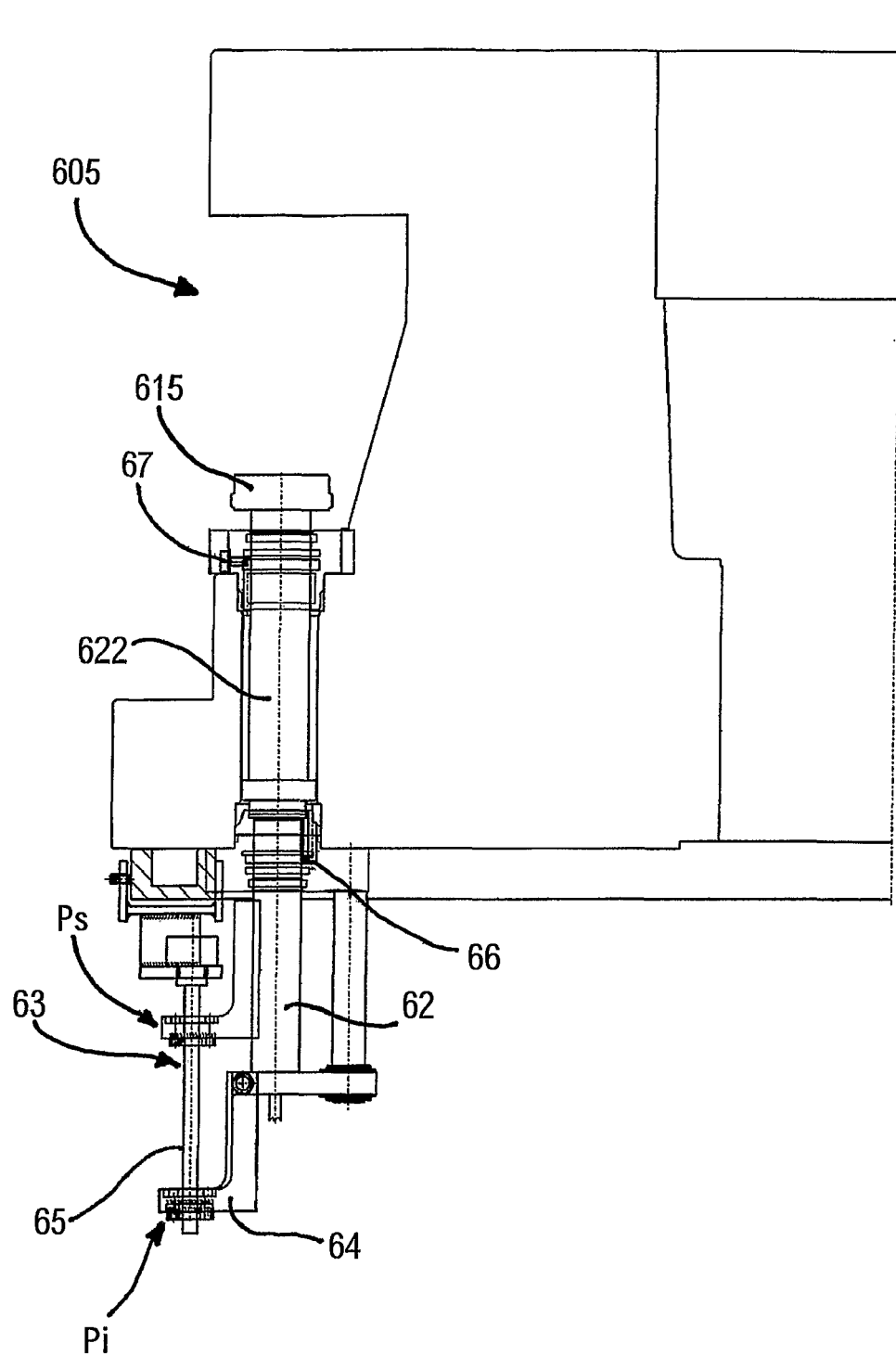
FIG. 20 is a partially sectioned schematic side view of a forming device provided with a position and/or speed and/or acceleration transducer and with a pressure sensor.

FIG. 20 shows a forming device comprising a mould 605 that can be fitted on a moulding carousel of an apparatus for producing caps industrially or can be fitted on a test apparatus. The mould 605 comprises a punch that is not shown and a die 615 that is movable in relation to the punch thanks to an actuator 622.

With the die 615 a position and/or speed and/or acceleration transducer is associated that may comprise a wire transducer or potentiometer. In the case shown in FIG. 20, the position and/or speed and/or acceleration transducer comprises a linear potentiometer 63 provided with a cursor 64 that can run along a rail 65 between a lower position $P_i$, shown in FIG. 20 by a thick line, and an upper position $P_s$ shown in FIG. 20 by a thin line. The lower position $P_i$ and the upper position $P_s$ correspond respectively to the opening position and to the closing position of the mould 605. The cursor 64 is fitted to a column 62 that is fixed relative to the actuator 622, in such a way as to detect the position and/or the speed and/or the acceleration of the column and therefore also of the actuator 622 and of the die 615.

The mould 615 may be provided, in addition to or in replacement of the linear potentiometer 63, with a pressure sensor arranged to detect the clamping force with which the die 615 is pushed against the punch.

The actuator 622 comprises a first chamber into which a first pressurised operating fluid is sent to move the die 615 to the punch. The actuator 622 furthermore comprises a second chamber, arranged opposite the first chamber, and containing a second operating fluid that ensures that, when the cap has been formed, the die 615 moves away from the punch, returning to the opening position.

The pressure sensor comprises a first pressure transducer 66 that enables the pressure of the first operating fluid in the first chamber to be detected at the actuator 622 and a second pressure transducer 67 that enables the pressure of the second operating fluid in the second chamber to be detected.

From the difference between the pressure value measured by the first pressure transducer 66 and the further pressure value measured by the second pressure transducer 67, it is possible to obtain the value of the force acting on the die 615.

Figure 21:
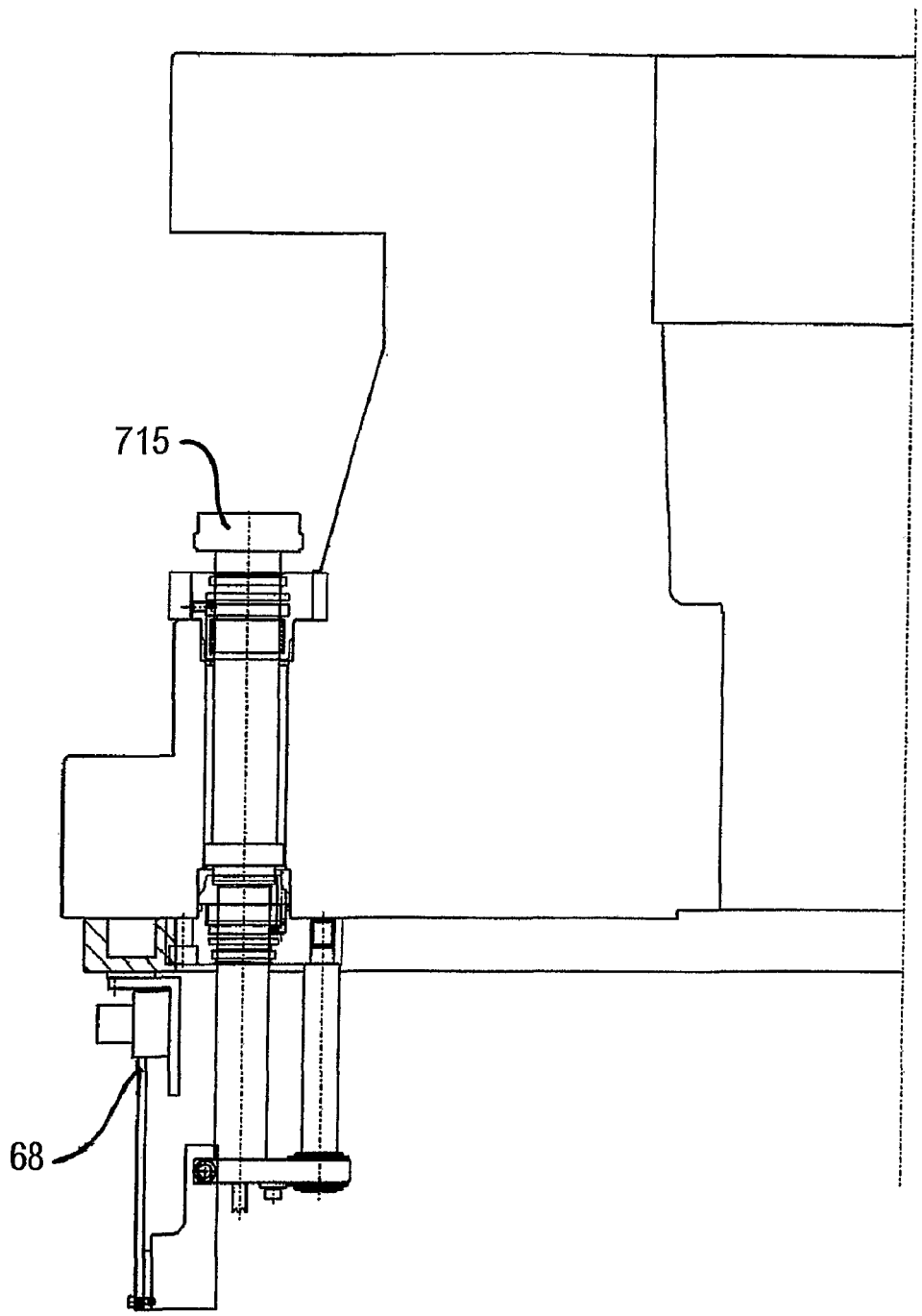
FIG. 21 is a view like the one in FIG. 20, showing an alternative embodiment of the position and/or speed and/or acceleration transducer.

In an alternative embodiment shown in FIG. 21, instead of the linear potentiometer 63, it is possible to use a rotating potentiometer 58, which enables the position and/or the speed and/or the acceleration to be measured with which the die 715 moves in relation to the punch, which is not shown.

In an embodiment that is not shown the position and/or speed and/or acceleration transducer associated with a movable part of the mould, for example with the die, may comprise ultrasound sensors, which may be fitted in a fixed position and not be fixed relative to the actuator.

Figure 22:
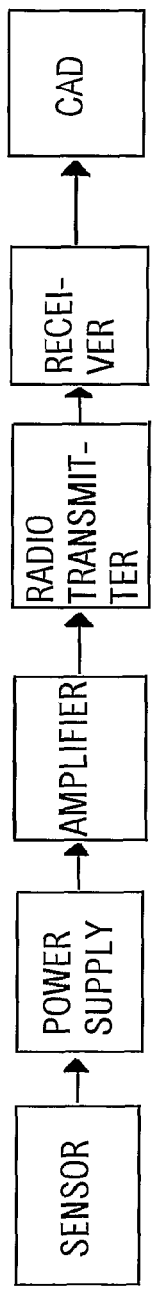
FIG. 22 is a flow diagram of the processing of signals detected by the sensor arrangement of the apparatus for producing caps.

FIG. 22 shows a flow diagram that schematically illustrates how the signals are processed that are received from the sensor arrangement disclosed with reference to the FIGS. 5 and 16 to 21.

The value of an operating parameter of the apparatus for producing caps, measured by a corresponding sensor with which a respective power supply is associated, is first amplified and is then sent to a radio transmitter, which transmits the signal to a receiver. Instead of the radio transmitter it is possible to provide a rotating electric joint or an optic transmission, in order to transmit the signal from the amplifier to the receiver.

Figure 23:
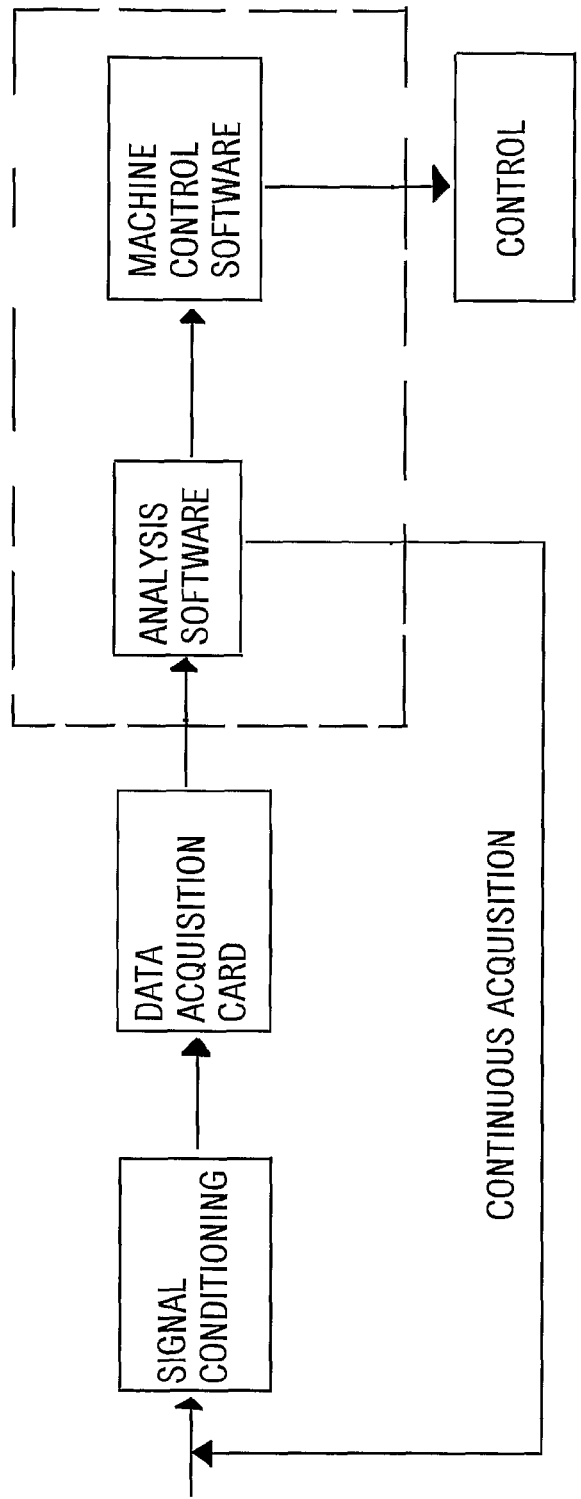
FIG. 23 is a flow diagram of the process of processing a signal inside a data acquisition centre shown in FIG. 22.

From the receiver a signal exits that typically has voltage comprised between 0 and 10 V, which is sent to a data acquisition centre (CAD) the operation of which is illustrated in detail in FIG. 23. Inside the data acquisition centre, the signal is first subjected to a conditioning process, for example by means of a filter and/or a further amplifier and/or an attenuator. The signal is then acquired by a data acquisition card and sent to enter into analysis software that analyses the signal. In particular, the signal is acquired continuously and the analysis software samples it and processes it statistically so as to provide a control outlet signal that can be processed by machine control software and be used to retroactively control certain components of the apparatus for producing caps that influence the value of the considered signal.

Figure 24:
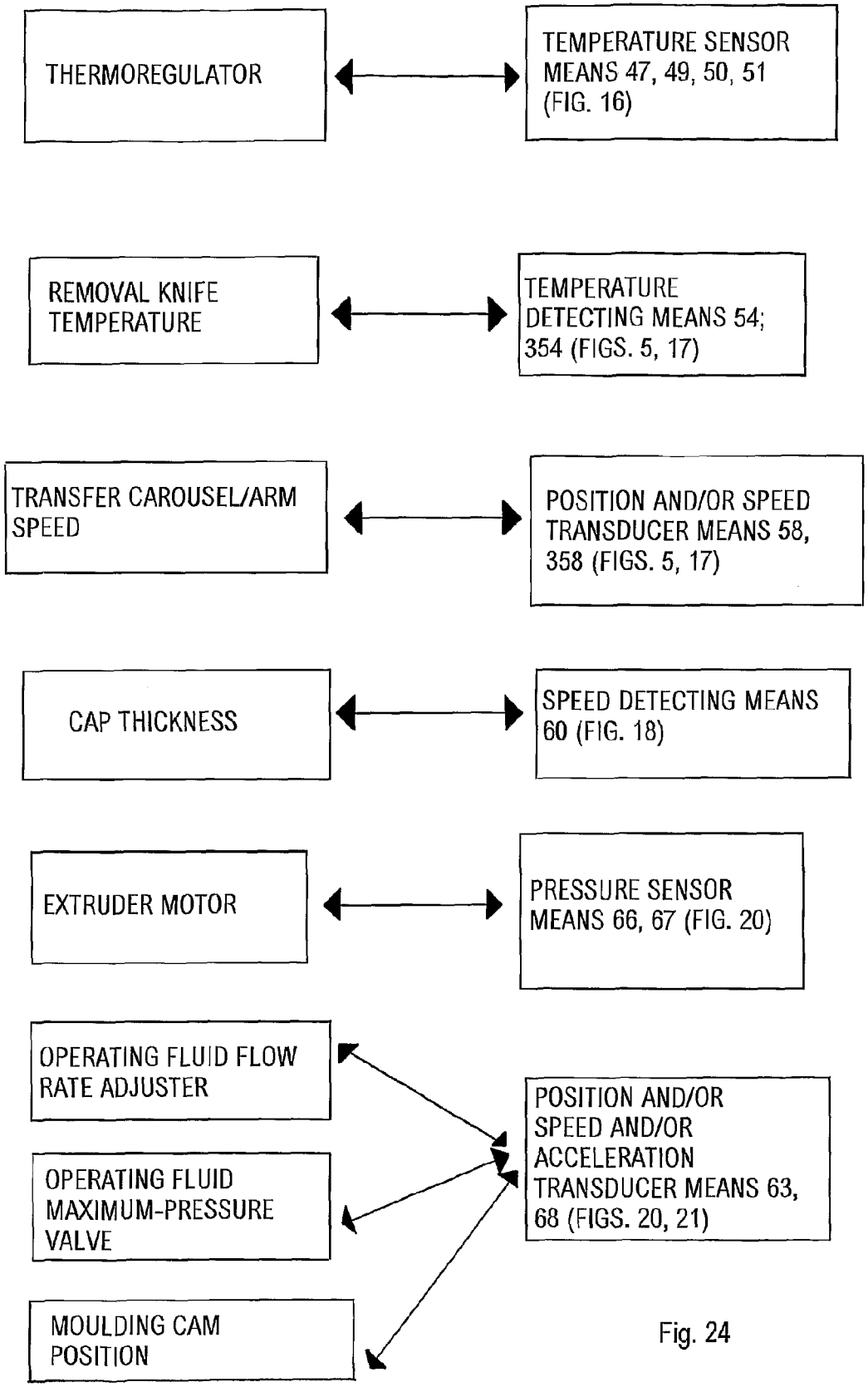
FIG. 24 is a block diagram showing some types of control that can be achieved with the sensor arrangement.

FIG. 24 shows some examples of retroactive control that are actuatable owing to the sensor arrangement. In particular, the approximate signal of the temperature of the mould detected owing to the temperature sensor arrangement 47, 49, 50, 51 can be used to retroactively monitor the thermostat that regulates cooling of the mould.

Also, the temperature signal received by the temperature-detecting device 54 or 354 can be used to control the temperature of the removal knife 10 or 310.

The signal received from the position transducer and/or from the speed transducer 58, 358 associated with the transfer carousel 52 in the industrial production apparatuses and associated with the arm 4 in the test apparatuses can be used to retroactively check the angular speed of the transfer carousel 52 or of the arm 4.

The signal coming from the speed-detecting device 60, which indicates the speed of the extruder, influences the thickness of the cap obtained.

The pressure sensor 66, 67 provides a signal that is indicative of the clamping force of the mould that can be used to retroactively control the motor of the extruder in order to modify the weight of the dose.

Lastly, the position and/or speed and/or acceleration transducer 63, 68 enables a flow rate adjuster of the operating fluid entering the actuator 22, 122, 622, and/or a maximum pressure valve of the operating fluid, and/or the position of a moulding cam to be controlled, which moulding cam at the appropriate moment provides the driving command of the actuator 22, 122, 622.

In addition to retroactively controlling the parameters listed above, the sensor arrangement can be used to monitor machine operation. The sensor arrangement is furthermore very useful for simulating in a test apparatus the same operating conditions that occur during industrial production. To do this, it is in fact sufficient to measure, by the sensor arrangement, the values of certain typical values during industrial production and set the values detected in the test apparatuses.

Also, the parameters acquired by the sensor arrangement can facilitate the development of new caps, in particular in terms of the design of the cap, its performance and its cooling after forming.

It is also possible to use the data of the sensor arrangement for the design of the moulds, for example for setting the dimensions and/or positioning of the conduits for a cooling fluid, or for the selection of the materials and/or of the coverings and/or of the thicknesses of the moulds.

Finally, owing to the sensor arrangement, it is possible to deduce the laws that regulate the forming process of the caps and optimise rejection of the faulty caps.

It is furthermore understood that the features disclosed in the disclosure of the Figures with reference to a specific embodiment can also be claimed in relation to any other disclosed embodiment or also in their own right.

The invention claimed is:

1. Apparatus comprising: a supply device to supply plastics; a compression moulding device to form an object from a dose of said plastics, wherein said compression moulding device comprises a first compression moulding element and a second compression moulding element; a transfer device drivable to transfer said dose from said supply device to said compression moulding device; a sensor arrangement comprising at least a clamping force sensor to measure a parameter that is indicative of a force with which said first compression moulding element is clamped against said second compression moulding element; a transmission system and a data acquisition center to receive a signal indicative of said force from said transmission system, wherein said transmission system includes an optic transmission or a radio transmission system, wherein the apparatus further comprises control software including computer readable instructions to retroactively control said supply device on the basis of said parameter measured by said clamping force sensor in order to modify a weight of said dose, said sensor arrangement comprising a temperature sensor arrangement to detect the temperature of said compression moulding device, said temperature sensor arrangement being associated with a punch of said compression moulding device, said temperature sensor arrangement being arranged near a threaded forming surface of said punch by means of which a thread on said object is obtained, said temperature sensor arrangement being used to retroactively monitor a thermostat that regulates cooling of said compression moulding device; said sensor arrangement comprising a temperature-detecting device associated with said transfer device, said transfer device being rotationally drivable, said temperature-detecting device being associated with a removal element assembled on said rotationally drivable transfer device to remove said dose from said supply device, said control software including computer readable instructions to retroactively control the temperature of said removal element on the basis of a value detected by said temperature-detecting device.

2. Apparatus according to claim 1, wherein said temperature sensor arrangement comprises a thermocouple.

3. Apparatus according to claim 1, wherein said temperature sensor arrangement comprises a thermistor.

4. Apparatus according to claim 1, wherein said temperature sensor arrangement is associated with a die of said compression moulding device.

5. Apparatus according to claim 1, wherein said temperature sensor arrangement is arranged near a forming surface of said compression moulding device suitable to obtain a bottom wall of said object.

6. Apparatus according to claim 1, wherein said temperature-detecting device comprises a thermocouple.

7. Apparatus according to claim 1, wherein said temperature-detecting device comprises a thermistor.

8. Apparatus according to claim 1, wherein said transfer device comprises a rotatable arm.

9. Apparatus according to claim 1, wherein said transfer device comprises a carousel.

10. Apparatus according to claim 1, wherein said sensor arrangement comprises an angular-position and/or an angular-speed transducer associated with said transfer device to measure the angular position and/or angular-speed thereof.

11. Apparatus according to claim 10, wherein said angular-position and/or angular-speed transducer comprises an encoder.

12. Apparatus according to claim 1, wherein said sensor arrangement comprises a speed-detecting device associated with a screw of an extruder of said supply device to measure the rotation speed of said screw.

13. Apparatus according to claim 12, wherein said speed-detecting device comprises an encoder.

14. Apparatus according to claim 1, wherein said sensor arrangement comprises a position and/or speed and/or acceleration transducer, associated with an actuating device arranged to move said first compression moulding element to said second compression moulding element.

15. Apparatus according to claim 14, wherein said position and/or speed and/or acceleration transducer is selected from a group constituted by: a potentiometer, ultrasound sensors.

16. Apparatus according to claim 1, wherein said sensor arrangement comprises a position and/or speed and/or acceleration detecting device associated with an extracting device cooperating with a punch of said compression moulding device to remove said object from said punch.

17. Apparatus according to claim 1, wherein said clamping force sensor comprises a pressure sensor.

18. Apparatus according to claim 17, wherein said pressure sensor is associated with a hydraulic actuating device suitable for moving said first compression moulding element.

19. Apparatus according to claim 1, comprising a control software including computer readable instructions to retroactively control at least an operating parameter of a movable part of said apparatus on the basis of a value of said operating parameter detected by said sensor arrangement.

20. Apparatus comprising: an extruder to supply plastics; a compression moulding device to form an object from a dose of said plastics; a transfer device rotationally drivable to transfer said dose from said extruder to said compression moulding device; a sensor arrangement to detect at least an operating parameter of said transfer device; a transmission system and a data acquisition to receive a signal indicative of said parameter from said transmission system, said transmission system including an optic transmission or a radio transmission system; wherein said transfer device is rotationally drivable to remove a dose of said plastics from said extruder, to transfer said dose from said extruder to said compression moulding device and to deposit said dose in said compression moulding device; a temperature-detecting device associated with a rotatable removal element assembled on said transfer device to remove said dose from said extruder; said temperature-detecting device being set up to measure a temperature of said removal element; and a controller to retroactively control the temperature of said removal element on the basis of a value detected by said temperature-detecting device.

21. Method for controlling an apparatus, wherein the apparatus comprises:
   a supply device to supply plastics;
   a compression moulding device to form an object from a dose of said plastics, said compression moulding device comprising a first compression moulding element and a second compression moulding element;

a transfer device drivable to transfer said dose from said supply device to said compression moulding device;

a sensor arrangement comprising at least a clamping force sensor to measure a parameter that is indicative of a force with which said first compression moulding element is clamped against said second compression moulding element;

a transmission system and a data acquisition centre to receive a signal indicative of said force from said transmission system, said transmission system including an optic transmission or a radio transmission system; and wherein the method comprises retroactively controlling said supply device on the basis of said parameter measured by said clamping force sensor in order to modify a weight of said dose.

22. Apparatus comprising: an extruder to supply plastics; a compression moulding device to form an object from a dose of said plastics, wherein said compression moulding device comprises a first compression moulding element and a second compression moulding element; a transfer device drivable to transfer said dose from said extruder to said compression moulding device; a sensor arrangement comprising at least a clamping force sensor to measure a parameter that is indicative of a force with which said first compression moulding element is clamped against said second compression moulding element; a transmission system and a data acquisition to receive a signal indicative of said force from said transmission system; wherein said transmission system includes an optic transmission or a radio transmission system; wherein the apparatus further comprises control software including computer readable instructions to retroactively control said extruder on the basis of said parameter measured by said clamping force sensor.

* * * * *